US012091222B2

(12) United States Patent
den Boer et al.

(10) Patent No.: US 12,091,222 B2
(45) Date of Patent: Sep. 17, 2024

(54) CAP SYSTEM FOR A CONCENTRATED REFILL CAPSULE

(71) Applicant: Conopco Inc., Englewood Cliffs, NJ (US)

(72) Inventors: Sebastiaan Wilhelmus Josephus den Boer, Ede (NL); Matthijs Lucas Bookelmann, Arnhem (NL); Sjoerd Bastiaan Zwartkruis, Ede (NL)

(73) Assignee: Conopco Inc., Englewood Cliffs, NJ (US)

(*) Notice: Subject to any disclaimer, the term of this patent is extended or adjusted under 35 U.S.C. 154(b) by 186 days.

(21) Appl. No.: 17/611,590

(22) PCT Filed: May 22, 2020

(86) PCT No.: PCT/EP2020/064247
§ 371 (c)(1),
(2) Date: Nov. 16, 2021

(87) PCT Pub. No.: WO2020/239617
PCT Pub. Date: Dec. 3, 2020

(65) Prior Publication Data
US 2022/0161973 A1 May 26, 2022

(30) Foreign Application Priority Data
May 24, 2019 (EP) .................................... 19176495

(51) Int. Cl.
*B65D 47/10* (2006.01)
*B05B 11/00* (2023.01)

(52) U.S. Cl.
CPC .......... *B65D 47/10* (2013.01); *B05B 11/0056* (2013.01); *B05B 11/0097* (2013.01)

(58) Field of Classification Search
CPC . B05B 11/0097; B05B 11/0056; B65D 47/10; B65D 47/106
(Continued)

(56) References Cited

U.S. PATENT DOCUMENTS 3,134,494 A 5/1964 Quinn
3,426,931 A 2/1969 Jensen
(Continued)

FOREIGN PATENT DOCUMENTS

CL 2017003187 6/2018
CL 2017003188 6/2018
(Continued)

*Primary Examiner* — Timothy L Maust
(74) *Attorney, Agent, or Firm* — N.V. Nederlandsch Octrooibureau

(57) ABSTRACT

A cap system for a refill capsule for a container for concentrated cleaning fluid is described. The cap system comprises a cap assembly (200) comprising a conduit (203) sealed by a closure member (208), frangibly connected to an inner surface of the conduit (203). The frangible connection extends in a first plane, which is orthogonal to the longitudinal axis (A) of the conduit (203). The cap system further comprises a plug (300), disposed at least partially within the conduit (203), the plug comprising an abutment surface (305) for bearing against the closure member (208), to break the frangible connection (210). The abutment surface (305) extends in a second plane, which is parallel to the first plane in which the frangible connection (210) extends.

15 Claims, 5 Drawing Sheets

(58) Field of Classification Search
USPC .......................................................... 141/366
See application file for complete search history.

(56) References Cited

U.S. PATENT DOCUMENTS

| | | | |
|---|---|---|---|
| 4,144,983 | A | 3/1979 | Pauls et al. |
| 4,903,865 | A | 2/1990 | Janowitz |
| 5,143,234 | A | 9/1992 | Klaus et al. |
| 5,413,233 | A | 5/1995 | Hall |
| 5,465,835 | A | 11/1995 | Ziegler et al. |
| 5,908,107 | A | 6/1999 | Baudin |
| 6,065,641 | A | 5/2000 | Valderrama |
| 6,076,689 | A | 6/2000 | Vassallo |
| 6,237,649 | B1 * | 5/2001 | Moisio .................. A61J 1/2089 141/319 |
| 6,533,113 | B2 | 3/2003 | Moscovitz |
| 6,655,524 | B2 | 12/2003 | De Laforcade |
| 6,772,807 | B1 * | 8/2004 | Tang .................... B67D 3/0032 141/366 |
| 6,793,101 | B2 | 9/2004 | Shinozaki et al. |
| 7,086,430 | B2 * | 8/2006 | Walton ................. B67D 3/0032 141/330 |
| 7,210,508 | B2 | 5/2007 | Behar |
| 7,607,460 | B2 * | 10/2009 | Johns ................. B65D 81/3211 141/319 |
| 7,621,413 | B2 | 11/2009 | Miota et al. |
| 7,632,457 | B2 | 12/2009 | Calvert et al. |
| 7,861,873 | B1 | 1/2011 | Bragg et al. |
| 8,226,126 | B2 | 7/2012 | Corey et al. |
| 8,365,933 | B2 | 5/2013 | Jackel |
| 8,443,970 | B2 | 5/2013 | Coon |
| 8,584,839 | B2 | 11/2013 | Aguadisch et al. |
| 9,339,439 | B2 | 5/2016 | Nudo |
| 9,862,528 | B2 * | 1/2018 | Isogai .................. B65D 51/228 |
| D836,404 | S | 12/2018 | Spivey et al. |
| 10,730,682 | B2 | 8/2020 | Rahmel et al. |
| 11,649,104 | B2 | 5/2023 | Rahmel et al. |
| 2002/0008106 | A1 | 1/2002 | Bezek et al. |
| 2005/0205151 | A1 | 9/2005 | Behar |
| 2005/0269281 | A1 | 12/2005 | Ding |
| 2006/0201905 | A1 | 9/2006 | Perrin et al. |
| 2007/0039975 | A1 | 2/2007 | Bochtler |
| 2007/0095835 | A1 | 5/2007 | Kim |
| 2007/0289670 | A1 | 12/2007 | Johns et al. |
| 2013/0319970 | A1 | 12/2013 | Sugawara et al. |
| 2014/0097106 | A1 | 4/2014 | Broekaert et al. |
| 2017/0043918 | A1 | 2/2017 | Guo |
| 2022/0204225 | A1 | 6/2022 | Den Boer et al. |
| 2022/0212841 | A1 | 7/2022 | Den Boer et al. |

FOREIGN PATENT DOCUMENTS

| | | |
|---|---|---|
| CL | 2011001048 | 10/2021 |
| CL | 2021003074 | 11/2021 |
| CL | 2021003086 | 11/2021 |
| CL | 2021003104 | 11/2021 |
| CL | 2021003103 | 7/2022 |
| CN | 1242751 | 1/2000 |
| CN | 1270915 | 10/2000 |
| CN | 1646046 | 7/2005 |
| CN | 1876515 | 12/2006 |
| CN | 101421171 | 2/2007 |
| CN | 101863343 | 10/2010 |
| CN | 102971225 | 3/2013 |
| CN | 103282287 | 9/2013 |
| CN | 107108083 | 11/2015 |
| CN | 105992742 | 10/2016 |
| CN | 106163939 | 11/2016 |
| CN | 106210049 | 12/2016 |
| CN | 106573710 | 4/2017 |
| EP | 0131132 | 1/1985 |
| EP | 0657381 | 6/1995 |
| EP | 2660165 | 11/2013 |
| EP | 3177259 | 12/2019 |
| FR | 2476607 | 8/1981 |
| FR | 2476697 | 8/1981 |
| GB | 2200898 | 8/1988 |
| GB | 2279069 | 12/1994 |
| GB | 2327409 | 1/1999 |
| JP | H0632351 | 4/1994 |
| JP | H11165756 | 6/1999 |
| JP | 2003284761 | 7/2003 |
| JP | 2004099082 | 4/2004 |
| JP | 2011016581 | 1/2011 |
| JP | 2011016588 | 1/2011 |
| JP | 2012035873 | 2/2012 |
| JP | 2012158361 | 8/2012 |
| JP | 2013525222 | 6/2013 |
| JP | 2014129140 | 7/2014 |
| JP | 2014129141 | 7/2014 |
| JP | 2015063342 | 4/2015 |
| JP | 2017074964 | 4/2017 |
| JP | 2019069799 | 5/2019 |
| RU | 2455213 | 7/2012 |
| RU | 2676664 | 1/2019 |
| WO | WO2007145773 | 12/2007 |
| WO | WO2010100892 | 9/2010 |
| WO | WO2012160117 | 11/2012 |

* cited by examiner

CAP SYSTEM FOR A CONCENTRATED REFILL CAPSULE

TECHNICAL FIELD

The present invention relates to a cap system for a concentrated cleaning product refill capsule system. The cap system comprises a cap assembly comprising a frangible seal, and a plug movably mounted within the cap assembly and configured to break the frangible seal.

BACKGROUND OF THE INVENTION

Any discussion of prior art throughout the specification should in no way be considered an admission that such prior art is widely known or forms part of the common general knowledge in the field.

WO2007/145773 describes a mixing unit comprising a sealed container joined to a second container.

JP2012-158361 describes a refill container that can facilitate refilling work.

Liquid cleaning and hygiene products, such as multipurpose surface cleaner, glass cleaner, or degreaser, are often supplied in ready-to-use concentrations in a wide variety of containers, with a wide variety of dispensing systems. Typically, such liquid cleaning products comprise one or more active ingredients diluted with water (or another solvent) to a concentration that is suitable for use in the home or commercial environment.

Cleaning products supplied in a ready-to-use concentration are advantageous in that the products can be supplied in a safe and effective concentration, and can be appropriately labelled. Ready-to-use products are also more convenient for the user, since they do not require dilution or reconstitution before use.

One example of a widely used container system for cleaning products is a spray bottle comprising a trigger actuator. Such systems generally comprise a bottle comprising a body and a neck, the neck being configured to engage a removable spray nozzle. The spray nozzle is generally secured to the neck of the bottle by way of complementary screw threads on the neck and on the nozzle. After use, the container or vessel in which the cleaning product was supplied is typically discarded and a replacement acquired. Although the spray bottle in which cleaning products are supplied generally have a lifetime that extends beyond the point at which the cleaning product has been depleted, the practice of refilling spray bottles with cleaning product is not widespread in a domestic setting.

In a commercial or industrial setting, spray bottles are sometimes refilled for re-use by diluting a predetermined volume of concentrated liquid with water. The concentrated cleaning liquid may be supplied in a bottle, which typically has a larger volume than the spray bottles used by cleaning professionals due to the fact that the concentrate vessel is not carried throughout the cleaning process.

However, although it is known to supply concentrated cleaning fluids for dilution prior to use, the practice of refilling spray bottles with water and a concentrated cleaning fluid is not widespread due to the many challenges in safely and effectively managing concentrated products, especially in a home environment.

Handling of concentrated cleaning fluids requires care both during refilling of a spray vessel and with regard to storage of the concentrated liquid. To avoid risks to health, even more so than diluted cleaning fluids, concentrated cleaning fluids should be transported and stored securely, and kept out of reach of children and animals.

Moreover, concentrated (undiluted) cleaning fluids may cause damage to surfaces within the home, and, thus, spillages should be avoided to avoid damage to clothing and household items.

Further difficulties may be encountered in ensuring that the concentrated cleaning product is diluted to a safe and effective concentration. Over-dilution of a concentrated cleaning fluid with water may lead to inferior cleaning results. Under-dilution of a concentrated cleaning fluid may present a risk to health, damage to household items and excessive consumption of the concentrated cleaning fluid.

Despite a desire to reduce the plastic waste generated by discarding empty bottles, and a desire to reduce the costs and resources required to ship and store ready-to-use cleaning products, refill systems that are suitable and convenient for use in domestic and professional settings are not widely available.

The present inventors have been able to solve many of the problems associated with conventional cleaning product dispensing systems and have been able to develop a refill capsule system for use with spray bottles (and other cleaning product vessels) that can overcome many of the above problems.

An object of the present invention is to provide a refill capsule and an associated cap assembly that overcome the above mentioned disadvantages associated with current cleaning products that allows vessels or containers for cleaning products to be reused.

It is another object of the invention to provide a refill system comprising a cap assembly that allows a user to safely and reliably deliver a predetermined volume of concentrated cleaning fluid to a spray bottle or similar vessel for dilution.

It is another object of the invention to provide a refill capsule and an associated cap assembly that allows for safe and reliable delivery of a concentrated cleaning fluid to a refillable vessel.

It is yet another object of the invention to provide a refill capsule and an associated cap assembly that can be simply and reliably coupled to a refillable vessel to discharge the concentrated liquid into the refillable vessel.

These and other objects are accomplished by the invention described in the following text and figures.

SUMMARY OF THE INVENTION

In a first aspect of the present invention, there is provided a cap system comprising a cap assembly having a frangible seal and a plug configured to break the frangible seal. The cap assembly according to the invention is described in the claims appended herewith. Optional features are described in the dependent claims.

The cap system according to the invention allows a volume concentrated cleaning fluid to be safely and conveniently stored and transported. The system can be engaged, for example by virtue of a threaded engagement, with a refillable vessel. Upon engagement of the system with a refillable vessel, the frangible seal is configured to break, thereby releasing the concentrated cleaning fluid contained in a capsule to flow into the refillable vessel.

DETAILED DESCRIPTION OF THE INVENTION

In the following, it should be note that the term 'comprising' encompasses the terms 'consisting essentially of' and 'consisting of'. Where the term 'comprising' is used, the listed steps or options need not be exhaustive and further steps or features may be included. As used herein, the indefinite article 'a' or 'an' and its corresponding definite article 'the' means at least one, or one or more, unless specified otherwise.

The terms 'upstream' and 'downstream' as used herein refer to the direction of flow of fluid through the refill system during use, with fluid flowing from an upstream end to a downstream end. In the context of the present invention, fluid flows from an upstream refill capsule system into a downstream refillable vessel. The proximal direction is the upstream direction, whilst the distal direction is the downstream direction.

In specifying any range of values or amounts, any particular upper value or amount can be associated with any particular lower value or amount.

The various features of the present invention referred to in individual sections above apply, as appropriate, to other sections mutatis mutandis. Consequently features specified in one section may be combined with features specified in other sections as appropriate. Any section headings are added for convenience only, and are not intended to limit the disclosure in any way.

The invention is not limited to the examples illustrated in the drawings. Accordingly it should be understood that where features mentioned in the claims are followed by reference numerals, such numerals are included solely for the purpose of enhancing the intelligibility of the claims and are in no way limiting to the scope of the claims.

The present invention relates to a cap system for a refill capsule. The cap system comprises a cap assembly configured to close a capsule body and a plug configured to break a frangible seal provided in the cap assembly when the capsule body is engaged (threadedly engaged, push fit, etc.) onto a refillable vessel. The frangible seal is provided by a frangible connection between the closure member and the conduit. The frangible connection extends in a first plane, which is orthogonal to a longitudinal axis A of the conduit.

As used herein, the term 'refill capsule' refers to a capsule body for containing a fluid, such as concentrated cleaning product.

The plug is disposed within the cap assembly and is configured to move from a first position to a second position as the system is engaged with a refillable vessel. The frangible connection is configured to break as a result of movement of the plug such that fluid contained within the capsule body can flow through the cap assembly and into the refillable vessel.

The cap assembly comprises a conduit extending from an upstream end configured to be in fluid communication with an internal volume of the capsule body, to a downstream end configured to discharge fluid from the capsule body into a refillable vessel. The conduit is sealed by a closure member which is connected to an inner wall of the conduit by a frangible connection.

The plug comprises a tubular body, which also defines an internal passage or conduit extending from an upstream end to a downstream end. The plug comprises a proximal-facing abutment surface configured to be brought into contact with the corresponding bearing surface of the closure member.

The plug also comprises a distal-facing abutment surface against which a rim of a refillable container may bear, if, for example, the cap system is engaged with a refillable vessel. The distal-facing abutment surface can be provided on a flange extending radially from the tubular body of the plug. Alternatively, the plug may comprise a circumferential skirt, at least partially surrounding the tubular body, on which the distal-facing abutment surface can be provided.

In an assembled system, the plug is disposed within the cap assembly and is configured to move (under the influence of an externally applied force) between a first position, in which the proximal abutment surface is positioned downstream of the frangible connection, to a second position, in which the proximal abutment surface is positioned upstream of the frangible connection. By moving the plug from the first position to the second position, the abutment surface of the plug bears against the bearing surface of the closure member and breaks the frangible connection between the conduit and the closure member. With the frangible connection between the closure member and the conduit broken, fluid contained in the capsule body can flow through the conduit of the cap assembly and through the tubular body of the plug, into a refillable vessel positioned therebelow.

The closure member is sealed within the conduit by a frangible connection extending around a periphery of the closure member. The frangible connection connects the closure member to the inner wall of the conduit. The connecting portion is configured to break when a force is applied to the closure member by proximal movement of the plug.

The abutment surface is configured to be brought into contact with the bearing surface of the closure member in such a manner that results in a net force being applied to the closure member along the longitudinal axis A, and perpendicular to the plane in which the frangible connection extends.

Accordingly, the abutment surface of the plug preferably has at least two fold rotational symmetry with respect to the longitudinal axis A. For example, the abutment surface of the plug can be provided by a continuous circumferential rim of the tubular body, terminating in a plane Q. Alternatively, the abutment surface can comprise a discontinuous rim comprising a plurality of projections equally spaced circumferentially around the rim of the tubular body, wherein the projections terminate in the plane Q. The projections may take the form of teeth spaced equally around the circumference of the rim. For example, in the case of an abutment surface comprising two teeth, the teeth may be disposed diametrically opposite each other.

Advantageously, by including projections equally spaced around the circumference of the tubular body, it may be possible to reduce the surface area of the proximal-facing abutment surface, which comes into contact with a seal to be broken. This increases the pressure applied to the bearing member (due to the reduced area over which the force is applied to the seal) and may in turn improve the reliability with which the seal fails. At the same time as reducing the surface area of the abutment surface, the equal spacing of the projections can ensure that the frangible connection is snapped, rather than asymmetrically peeling. Such an arrangement may allow the thickness of the frangible connection to be increased (thereby increasing the manufacturing tolerance), without significantly increasing the force required from the user to move the plug from the first position to the second position (e.g. by screwing the cap system onto the neck of a refillable vessel.

By providing a rotationally symmetric abutment surface configured to apply a net force along the longitudinal axis A, and perpendicular to the plane in which the frangible connection extends, the frangible connection can be configured to snap, failing around its circumference, rather than peeling from an initial breach around the seal. Such a circumferential failure of the seal can result in a snap or click sound that is audible to the user, thereby providing positive feedback that the frangible connection has been successfully broken and that the liquid contained in a capsule body can escape.

The cap assembly is preferably molded to form at least the closure member, connecting portion, and conduit as a continuous molded piece. The connecting portion may be configured to be the thinnest portion of the cap assembly. The connection portion may be between 0.05 and 0.2 mm thick, more preferably between 0.1 and 0.2 mm thick. The cap assembly can be formed from a molded polymer material, for example a polypropylene material. The polymer material can be injection molded.

For convenience, the tubular body of the plug and the conduit of the cap assembly can have a circular transverse cross-section. This can allow for easier manufacturing and assembly. However, it will be appreciated that other cross-sectional geometries are possible within the scope of the invention. For example, polygonal transverse cross-sections are also possible, as are elliptical transverse cross-sections.

The cap assembly and the plug assembly may provide further advantages in addition to the advantages described above.

For example, the closure member may be hollow and taper from a downstream base to an upstream peak. The downstream base may comprise an opening and the bearing surface may surround the opening. By providing an inverted hollow closure member as described above, the likelihood of the closure member settling and blocking the conduit after the seal has been broken may be reduced because the closure member can be configured to float within the fluid contained in the capsule body.

The conduit may have a first cross-sectional diameter at the upstream end and a second cross-sectional diameter at the downstream end, wherein the first cross-sectional diameter is greater than the second cross-sectional diameter.

The frangible connection may be formed between the closure member and the conduit in a region of the conduit having the second, smaller cross-sectional diameter. The plug may be configured to push the closure member into the region of the conduit with the larger diameter, as the plug is advanced in an upstream direction. In other words, the system can be configured such that the proximal-facing abutment of surface of the plug is disposed in the wider portion of the conduit when the plug is in the second position.

By providing a region of the conduit having a larger cross-sectional diameter than the maximum diameter of the closure member, the likelihood of the closure member blocking the egress of fluid through the conduit it reduced.

The cap assembly can optionally comprise an outer wall surrounding at least a portion of the wall that forms the conduit. The wall that forms the conduit will therefore be referred to hereafter as the inner wall. The outer wall can surround the inner wall and be spaced apart therefrom to form a circumferential void. The inner wall and the outer wall can be connected to each other by a connecting wall.

Depending on the position of the connecting wall, the circumferential void can be configured as an upstream void, having an open upstream end configured to receive the neck of the capsule body, or as a downstream void, having an open downstream end configured to receive at least a portion of the plug and/or the neck of a refillable vessel. It will be appreciated that a single connecting wall can provide an upstream void and a downstream void, with the connecting wall separating the two.

By providing an upstream void, security against leakage between the cap assembly and the capsule body may be improved, since the neck of the capsule body can be received in the void, between the inner wall and the outer wall. For example, the outer wall can be configured with threads on its inner surface configured to engage threads on the outer surface of the neck of the capsule body to form a sealing engagement between the outer wall of the cap assembly and the outer surface of the neck. The inner wall may be configured as a barrel seal configured to form a seal with the inner surface of the neck of the capsule body. Finally, a third sealing relationship may be formed between the rim of the capsule body and the connecting wall of the cap assembly. The skilled person will appreciate that any combination of these sealing arrangements may be implemented to provide improved security against leakage.

In addition to or as an alternative to an upstream void, a downstream void may provide additional alternatives. For example, the downstream void may fully surround the plug to prevent accidental contact with the plug, which could result in accidental rupture of the frangible connection. Moreover, downstream void can house the distal-facing abutment surface of the plug, and be configured to receive the neck of a refillable vessel. The downstream void may house a skirt wall provided on the plug, which will be described in more detail below.

In addition to the tubular body, the plug may further comprise a skirt wall that at least partially surround the tubular body. The skirt wall is spaced from the tubular body to form a plug recess therebetween. The skirt wall extends from a first end at which it is connected to the tubular body, to a free end.

The plug recess is configured to receive the downstream end of the inner wall that forms the cap assembly conduit. This can securely locate the plug within the cap assembly in the correct position and guide its movement. The depth of the plug recess also determined the maximum extend of travel of the plug within the cap assembly, since once the plug reaches its second position, the inner wall will abut the closed end of the plug recess, preventing further inward travel of the plug.

The free end can comprise the flange on which the distal-facing abutment surface is provided, and may further comprise additional features configured to engage the cap assembly to more securely retain the plug in place within the housing.

For example, the free end of the skirt may comprise a radially outwardly extending flange that provides the distal-facing abutment surface for engaging the rim of the refillable vessel. The free end of the skirt may also comprise at least one radially outwardly extending claw configured to engage at least one screw thread on an internal surface of the outer wall of the cap assembly. The claws are configured to ride over the threads as the plug is pushed from the first position to the second position. However, the claws may prevent or limit the extent to which the plugs may be shaken loose from the cap assembly during transport.

Additionally or alternatively, it may also be possible to improve the security with which the plug is maintained in the first position during transport and/or storage by providing a circumferential ridge or protrusion on the inner surface on the cap assembly conduit and/or on the outer wall of the tubular body.

To further improve the flow of fluid through the cap system, the plug may comprise one or more cut-outs to form a discontinuity in the rim of the tubular body. The one or more discontinuities may ensure that a flow path through the cap assembly is possible even if the closure member settles over the rim of the tubular body.

To provide yet further security against leakage between the capsule body and the cap system, a shrink wrap cover may be provided, extending around at least a portion of the capsule body and at least a portion of the cap assembly.

The invention will now be further exemplified with the following non-limiting figures and examples.

FIGURES

By way of example, the present invention is illustrated with reference to the following figures, in which.

DETAILED DESCRIPTION OF THE FIGURES

In the detailed description of the figures, like numerals are employed to designate like features of various exemplified devices according to the invention.

Figure 1:
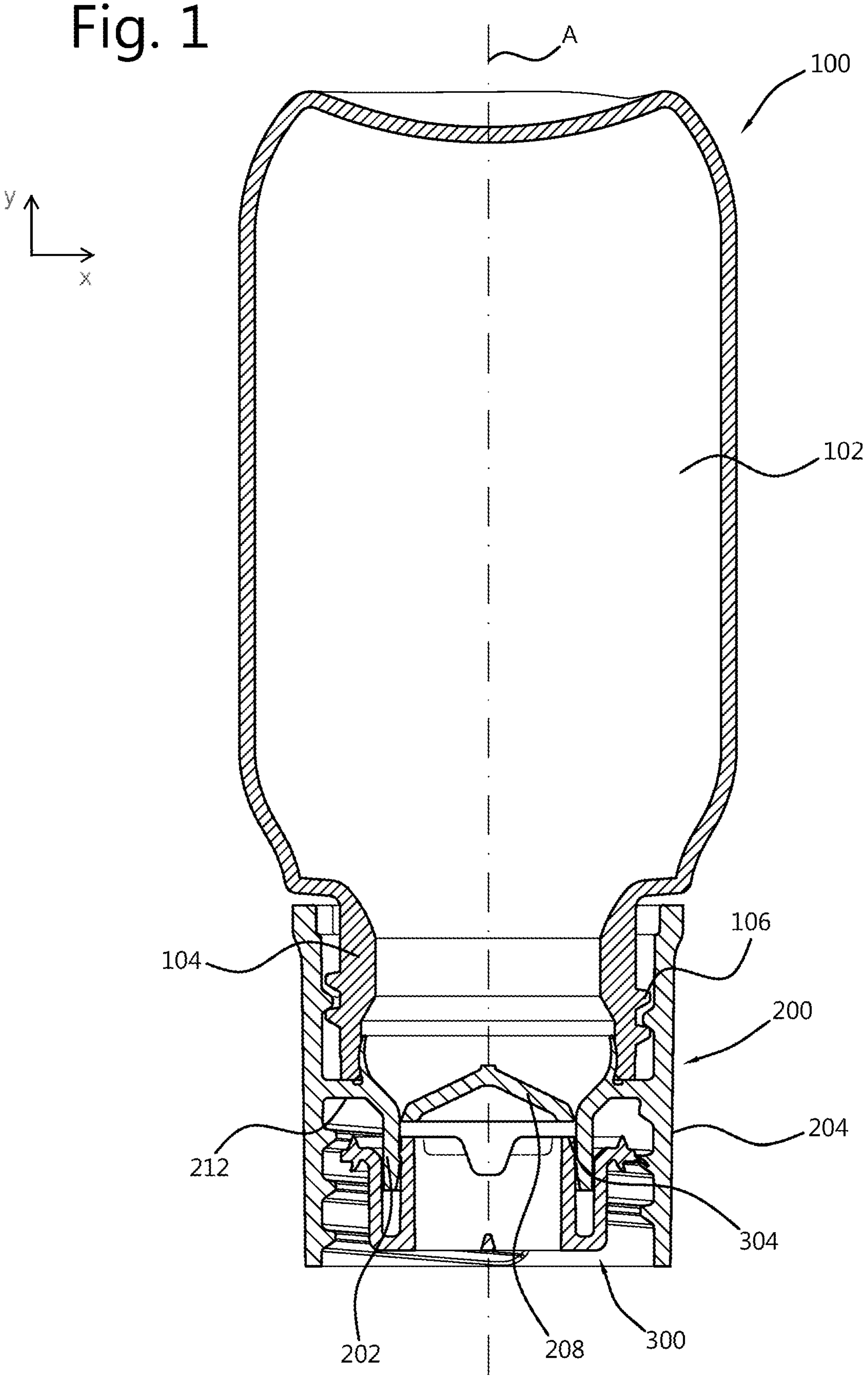
FIG. 1 shows a longitudinal cross-sectional perspective view of a refill capsule system comprising a refill capsule, a plug, and a cap assembly according to the present invention.

FIG. 1 shows a refill system for containing a concentrated cleaning fluid and configured for use with a refillable vessel. FIG. 1 shows a cross-sectional view of an assembled refill system comprising a capsule body 100, a cap assembly 200, and a plug 300.

As shown in FIG. 1, the capsule body 100 comprises a generally hollow receptacle configured to receive a volume of concentrated cleaning fluid. The concentrated cleaning fluid is contained within an internal volume 102 of the capsule body 100. The capsule body 100 comprises a neck 104 comprising an open end surrounded by a rim 108. The neck 104 comprises a capsule thread 106 configured to engage a corresponding screw thread on the cap assembly 200.

As shown in FIG. 1, a longitudinal axis A extends through the open end of the capsule body 100 from a closed end of the capsule body 100, through the cap assembly 200, and the plug 300.

The cap assembly 200 is configured to seal the capsule body 100 and extends from an upstream end to a downstream end. The upstream direction is the direction towards the capsule body 100 and the downstream end direction is the direction toward the refillable vessel, when the system is in use.

The cap assembly 200 defines a conduit 203 through the cap assembly 200 though which fluid can flow to exit the capsule body 100. The conduit 203 extends through the cap assembly 200 from an open upstream end to an open downstream end. A closure member 208 seals the conduit 203 to prevent fluid communication between the upstream end and the downstream end of the conduit 203. The closure member 208 is sealed to the inner wall of the conduit by a frangible connection 210, which can be broken by applying pressure to the closure member 208.

The plug 300 is disposed within the cap assembly 200 and is configured to bear against the closure member 208 to break the frangible connection 210 as the cap assembly 200 is screwed onto (or otherwise engaged with) a refillable vessel. The plug 300 comprises a tubular body having providing an internal bore through which cleaning fluid can escape through once the plug 300 has been used to rupture the seal in the cap assembly 200.

Advantageously, the refill system can be wrapped in a shrink wrap cover. The shrink wrap cover can cover the whole cap assembly 200 and the capsule body 100, or it may cover only a portion of the capsule body 100 and the capsule assembly 200. Advantageously, it may extend around the cap system such that the join between the capsule body 100 and the cap assembly 200 is surrounded by a shrink wrap cover. By shrink wrapping the capsule body 100 and the cap assembly 200 together, the likelihood of the cap assembly 200 being inadvertently removed from the capsule body 100 is further reduced.

Use of the System

Figure 2B:
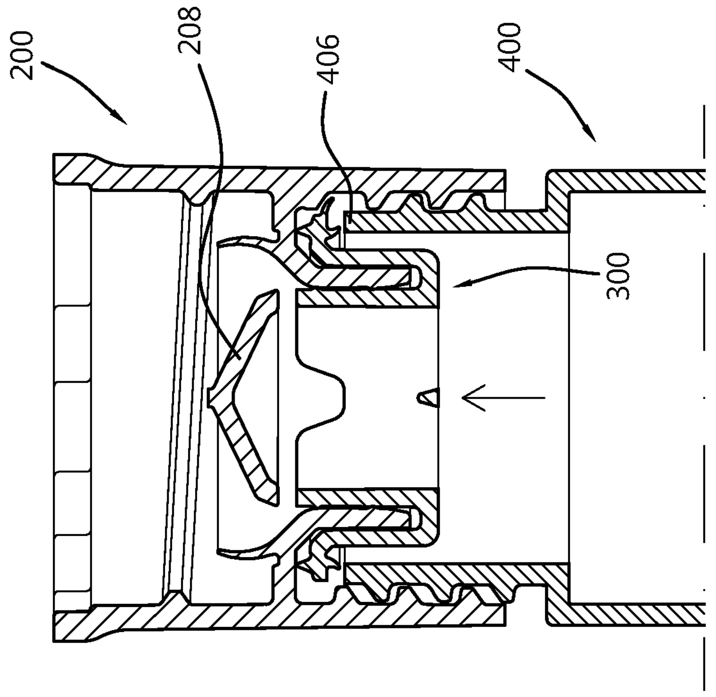
FIG. 2B shows a longitudinal cross-sectional view of the refill system after rupture of the frangible seal.
Figure 2A:
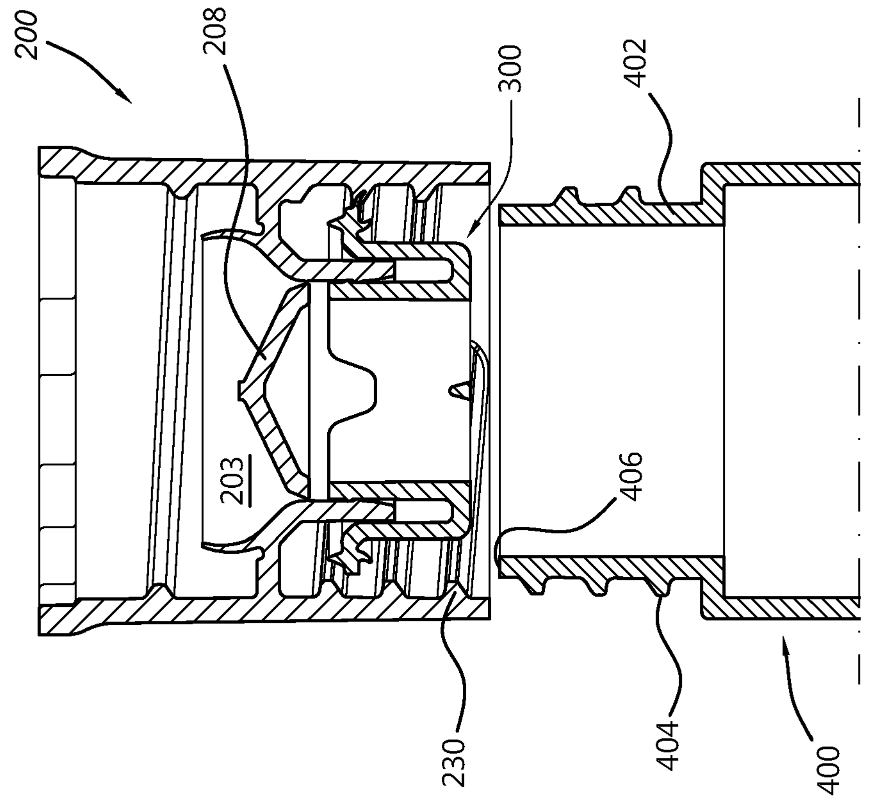
FIG. 2A shows a longitudinal cross-sectional view of the refill system before rupture of the frangible seal.

Referring now to FIGS. 2A and 2B, use of the system will be described in more detail.

FIGS. 2A and 2B show an enlarged view of the refill system comprising cap assembly 200, and plug 300. The capsule body 100 is omitted for clarity. FIGS. 2A and 2B also show the upper portion of a refillable vessel 400 with a neck 402 that defines an opening in fluid communication with an interior volume of the refillable vessel 400.

FIG. 2A shows the system before use with the closure member 208 sealed within the conduit 203. As shown in FIG. 2A, the refill system is supplied with the plug 300 disposed within the cap assembly 200. In the configuration shown in FIG. 2A, the plug 300 occupies a first position in which it is spaced apart from (i.e. not in direct contact with) the closure member 208.

The plug 300 is mounted within the cap assembly 200 such that it is secured in place against accidental movement (e.g. during transport or storage). However, the plug 300 and the cap assembly 200 are configured such that the plug 300 can be pushed axially towards the closure member 208 by bearing on a distal-facing abutment surface provided on the plug 300.

The plug 300 can be secured or mounted within the cap assembly 200 in different ways. An exemplary plug and cap assembly combination will be discussed in further detail with reference to FIGS. 3A-5.

The cap assembly 200 comprises one or more first screw threads 230 (or other engagement means) configured to engage a corresponding vessel screw thread on a refillable vessel 400. The screw thread 230 allows the cap assembly 200 to be screwed onto the neck 402 of the refillable vessel 400. The first screw thread(s) 230 are provided on an inner surface of the cap assembly 200, whilst the vessel thread 404 of the refillable vessel 400 is provided on an outer surface of the refillable vessel 400. Therefore, as the cap assembly 200 is screwed onto the neck 402 of the refillable vessel 400, the neck 402 of the refillable vessel 400 and the rim 406 with which the neck 402 terminates are guided into the cap assembly 200.

Referring now to FIG. 2B, the plug 300 is disposed within the cap assembly 200 such that the introduction of the neck 402 into the cap assembly 200 tends to bear against the plug 300, pushing it in an upstream direction, towards the capsule body 100 and into contact with the closure member 208.

As shown in FIG. 2B, as the rim 406 advances within the cap assembly 200, the plug 300 is first brought into abutment with the closure member 208 and then begins to exert a force thereagainst as the rim 406 forces the plug to advance further relative to the cap assembly 200. As the plug 300 bears against the closure member 208, the force exerted against the closure member 208 increases to a point at which the frangible connection between the closure member and the conduit 203 fails, and the closure member 208 is pushed in an upstream direction such that it no longer seals the conduit 203. FIG. 2B thus shows the second position of the plug 300.

Once the seal provided by the closure member 208 is broken, concentrated cleaning fluid can flow from the internal volume 102 of the capsule body 100, through the conduit 203 of the cap assembly 200, through the internal bore of the plug 300, and into the refillable vessel 400 below.

Once the capsule body 100 has been emptied, the cap assembly 200 can be unscrewed from the neck 402 of the refillable vessel 400, and discarded safely.

By providing a refill system as described above, it is possible to provide a safe, convenient, and effective way of delivering a controlled quantity of concentrated cleaning fluid to a refillable vessel.

Several advantages may be provided by the system described here, which may result in an improved refill system.

Improved Cap Assembly

Figure 3A:
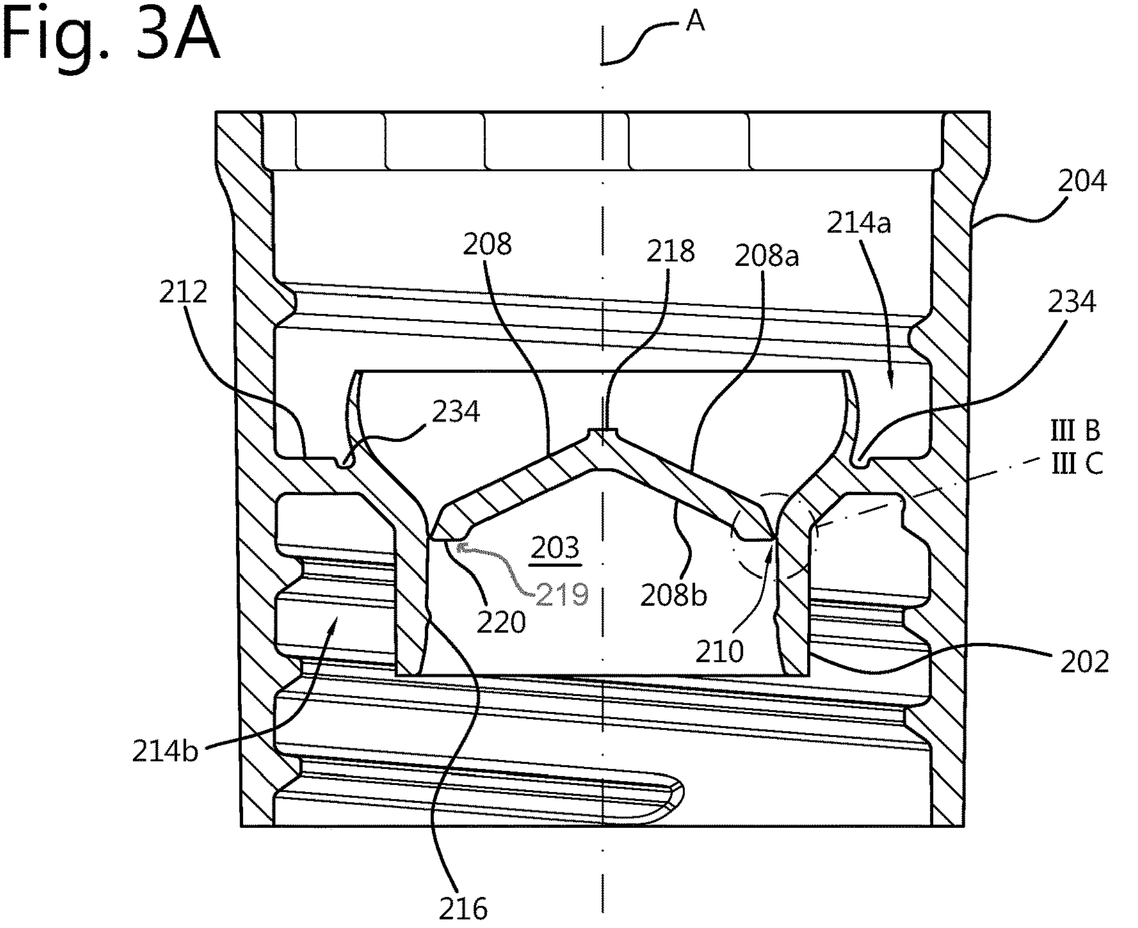
FIG. 3A shows a longitudinal cross-sectional view of a cap assembly according to a first configuration, the cap assembly comprising a frangible seal.
Figure 3B:
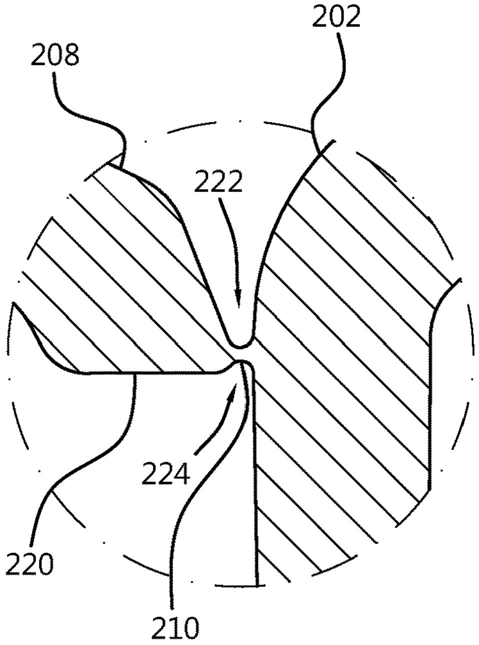
FIG. 3B shows an enlarged view of the frangible seal of FIG. 3A according to a first configuration.
Figure 3C:
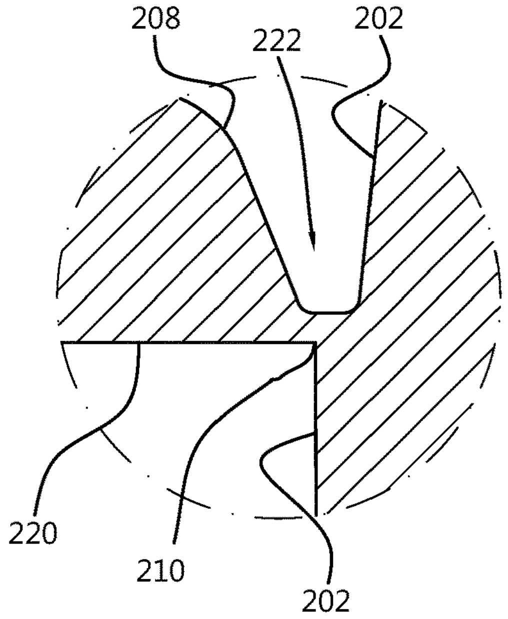
FIG. 3C shows an enlarged view of the frangible seal of FIG. 3A according to a second configuration.

The cap assembly 200 will now be described in more detail with reference to FIGS. 3A-3C. FIG. 3A shows a cross-sectional view of the cap assembly 200 described above. FIG. 3B shows an enlarged cross-sectional view of a frangible connection 210 according to a first exemplary configuration. FIG. 3C shows an enlarged cross-sectional view of a frangible connection 210 according to a second exemplary configuration. For clarity, the plug 300 is omitted from FIGS. 3A-3C.

The cap assembly 200 described herein includes a number of improvements that may provide enhanced performance. The cap assembly 200 may comprise an improved wall structure, an improved frangible connection, enhanced safety features, and improved audible and tactile feedback to the user. Each of these improvements will be described in more detail below. Moreover, it will be appreciated that the features described below may be incorporated in a refill system alone, or in combination with other features to provide a further improved product.

As shown in FIG. 3A, the cap assembly 200 comprises an inner wall 202 that defines a conduit 203 extending from an open upstream end to an open downstream end. A closure member 208 is positioned within the conduit 203 and has an upstream side **208*a* and a downstream side 208*b*. The closure member 208 is sealed around its periphery to the inner wall 202 with a frangible connection 210. The frangible connection 210 is located between the upstream open end and the downstream open end of the conduit 203** and will be described as in more detail with reference to FIGS. 3B and 3C.

An outer wall 204 extends around the inner wall 202. The outer wall 204 is connected to the inner wall 202 by a connecting wall 212. The connecting wall 212 extending between the inner and outer walls 202, 204 prevents the flow of fluid through the cap assembly 200 in the space between the inner and outer walls 202, 204. The only route through which fluid may flow through the cap assembly 200 is thus through the conduit 203 when the frangible connection 210 has been broken.

The inner wall 202 is arranged coaxially within the outer wall 204 to form a circumferential void 214 between the inner and outer walls 202, 204. In the embodiment shown in FIG. 3A, the connecting wall 212 connects to each of the inner and outer walls 202, 204 part way along their length. This forms an upstream void **214*a* between the inner and outer walls 202, 204 upstream of the connection wall 212, and a downstream void 214*b* between the inner and outer walls 202, 204 downstream of the connecting wall 212**.

By providing an upstream void **214*a*, the seal between the capsule body 100 and the cap assembly 200 can be improved because the inner wall 202 can be specially adapted for forming a seal between the cap assembly 200 and the capsule body 100 within the neck 104 of the capsule body 100, whilst the outer wall can be 203 can be specially adapted to form a seal between the cap assembly 200 and the capsule body 100 around the neck 104 of the capsule body 100**.

In at least some examples, the outer wall 204 can provide a child-resistant closure with the capsule body 100. For example, the outer wall 204 can comprise a plurality of ratchet teeth (not shown) that mate with a plurality of ratchet teeth on the capsule body 100 to allow the cap assembly 200 to be screwed onto the capsule body 100, but prevent the cap assembly 200 from being unscrewed from the capsule assembly. The child resistant closure may prevent the cap assembly 200 from being unscrewed from the capsule body 100 entirely (or at least without breaking the cap assembly 200) or it may be configured to prevent the cap assembly 200 from being unscrewed from the capsule body 100 unless a predetermined axial force is applied to the cap assembly 200 in a direction towards the capsule body 100.

Moreover, by providing an upstream void **214*a* to accommodate the neck 104 of the capsule body 100, the neck 104 can be used to provide structural reinforcement to the cap assembly 200 to minimise the degree to which is flexes as pressure is applied to rupture the frangible connection 210. By minimising the degree to which the cap assembly 200 can flex under pressure from the plug 300, the frangible connection 210** is more likely to fail suddenly under pressure, resulting in a snap or click that provides audible and tactile feedback to the user that the seal is broken and that the concentrated liquid can be dispensed.

By providing a downstream void **214*b*, at least a portion of the plug 300 can be accommodated between the inner and outer walls 202, 204 downstream of the connecting wall 212. This provides a space in which the plug 300 can be retained within the cap assembly 200 during transport and storage, and held securely in place until the user screws the refill system onto a refillable vessel. By providing the plug 300 in a downstream void, the plug can be shielded from accidental contact by handlers, thereby reducing the risk that the plug 300** is accidentally moved between the first and second positions during transit or storage.

It will be appreciated that although the provision of an upstream void **214*a* and a downstream void 214*b* can be combined to provide enhanced advantages over known systems, in at least some examples the cap assembly 200 can comprise only an upstream void 214*a* or only a downstream void 214*b***.

The conduit 203 provided by the inner wall 202 of the cap assembly 200 can have a variable diameter along its length. For example, the diameter of the conduit 203 upstream of the frangible connection 210 can be larger than the diameter of the conduit 203 downstream of the frangible connection 210. By increasing the diameter of the conduit 203 upstream of the frangible connection 210, the closure member 208 can be pushed by the plug 300 into a region of the conduit 203 that has a larger diameter than the closure member 208. This further reduces the likelihood that the closure member 208 can occlude the conduit 203 to prevent the egress of cleaning fluid from the capsule body 100 through the cap assembly 200 and the plug 300, once the plug has been moved to its second position.

In the embodiment shown in FIG. 3A, the inner wall 202 is shaped with a barrel shaped or bulbous upstream end portion to provide a barrel seal for sealing with the neck 104 of the refill capsule body 100. The inner wall 202 is configured to sit within the opening of the capsule body 100 and form a seal between an outer surface of the inner wall and an inner surface of the opening.

Instead of comprising a cylindrical shape having sides that are substantially parallel, the upstream end of the conduit 203 can be barrel shaped, steadily decreasing in transverse cross-sectional diameter (i.e. a cross-section in a plane perpendicular to the longitudinal axis A) from a maximum diameter upstream of the frangible connection 210 towards the upstream rim of the inner wall 202. By varying the diameter of the conduit 203 at the upstream end, variation in manufacturing tolerances can be accounted for and/or a tighter seal can be provided between the capsule body 100 and the cap assembly 200 because the narrower open end of the conduit 203 can be inserted into the neck 104 of the capsule body 100, and a tight seal can be formed between the barrel sealing rim and the neck of the capsule body 100.

Figure 5:
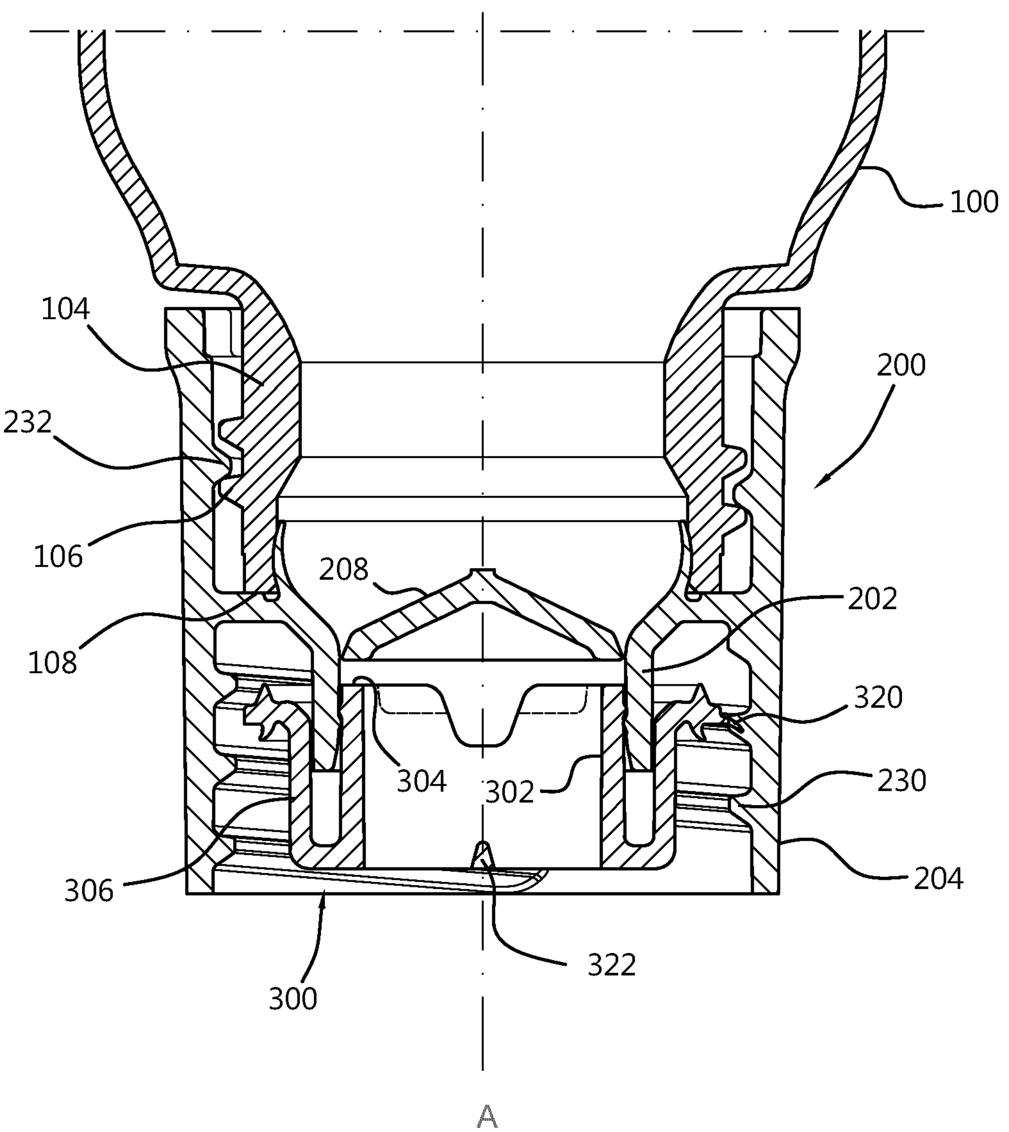
FIG. 5 shows an enlarged longitudinal cross-sectional view of a proximal end of a refill capsule system comprising the cap system of FIG. 1.

As shown in FIG. 3A, the connecting wall 212 may further comprise a circumferential notch 234 or channel adjacent the inner wall 202 on the upstream side. The notch 234 reduces the thickness of the connecting wall 212 at the point where the inner wall 202 joins the connecting wall 212. This can increase the degree to which the upstream portion of the inner wall 202 can flex inwardly to fit within the neck 104 of the capsule body 100 (as shown in FIG. 5).

The inner wall 202 downstream of the closure member 208 has a generally cylindrical form, with substantially parallel walls. The downstream end of the inner wall 202 is configured to fit within the neck 404 of the refillable vessel 400.

As shown in FIG. 3A, the inner surface of the inner wall 202 can comprise a radially inwardly protruding ridge or protrusion 216. The ridge or protrusion 216 can advantageously engage a corresponding protrusion on the plug 300, as will be described in more detail below with reference to FIG. 5.

As shown in FIG. 3A, the closure member 208 is positioned within the conduit 203 and closes the conduit to prevent the passage of fluid therethrough unless the frangible connection 210 is broken.

The closure member 208 shown in FIG. 3A comprises a tapered shape, extending from a downstream base 219 to an upstream peak 218. For example, the closure member can comprise a conical or frustoconical shape. The base 219 is preferably open to allow access to the hollow interior of the closure member 208 from the downstream side. By providing a hollow, peaked closure member 208, the likelihood of the closure member 208 settling over the opening formed through the inner conduit after the seal has been broken is reduced. To the contrary, the buoyancy provided by the hollow closure member 208 means that the closure member tends to float away from the conduit 203.

The base 219 of the closure member provides a bearing surface 220 against which the plug 300 can bear to apply pressure to rupture the frangible connection 210. The bearing surface 220 preferably extends in a plane that is orthogonal to the longitudinal axis A. The frangible connection 210 preferably also extends in a plane perpendicular to the longitudinal axis A. The frangible connection 210 can extend in the same plane as the bearing surface 220, or in a plane parallel to the plane R.

FIGS. 3B and 3C each show an enlarged view of a frangible connection 210 formed between the closure member 208 and the inner wall 202 according to the invention.

As shown in FIGS. 3B and 3C, the frangible connection 210 extends between the inner wall 202 and an outer perimeter of the closure member 208. The frangible connection 210 is preferably between 0.05 and 0.2 mm thick. However, the skilled person will appreciate that other dimensions may be chosen depending on the materials used and the dimensions of the cap system.

The thickness (in a longitudinal direction) and the width (in a radial direction) of the frangible connection are preferably closely controlled. By controlling the width and the thickness of the frangible connection 210, the reliability with which the frangible connection 210 fails may be more reliable. This may provide a more consistent user experience.

The thickness and the width of the frangible connection can be controlled in different ways.

For example, in the exemplary configuration shown in FIG. 3B, the frangible connection 210 is formed between two opposing recesses or notches 222, 224. The recesses or notches 222, 224 are shown in FIG. 3B, which is a cross-sectional view. However, it will be appreciated that for a closure member 208 having a circular transverse cross-section, the recesses, or notches 222, 224 may be formed as circumferential channels or annular grooves.

The first recess 224 is formed upstream of the frangible connection 210, between an upstream side 208*a* of the closure member 208 and an interior surface of the inner wall 202. The second recess 224 is formed downstream of the frangible connection 210, between a downstream side 208*b* of the closure member 208 and an interior surface of the inner wall 202. By forming a frangible connection 210 between two opposing recesses or channels, the thickness (in a longitudinal direction) and the width (in a transverse direction) of the frangible connection 210 can be controlled and minimised.

The notches 222 and 224 (or the channels) extend from an open end to a closed end, with the frangible connection 210 forming the closed end in each case. The closed end of each recess or channel may advantageously have a rounded profile, as shown in FIG. 3B. By providing a frangible connection 210 between opposing rounded notches or channels, the width of the frangible connection at the thinnest part can be closely controlled.

It will be appreciated that the transverse width of the thinnest part of the frangible connection 210 can be controlled by varying the radius of curvature of the rounded notches. The radius of curvature of the first notch or recess 222 can be chosen to be substantially the same as the second notch or recess 224 or it may be different.

The second (downstream) notch or channel 224 in the example illustrated in FIG. 3B means that the frangible connection 210 extends in a different plane to the bearing surface 220. However, in an alternative exemplary configuration, the second circumferential notch 224 can be omitted.

An alternative exemplary configuration is shown in FIG. 3C. As shown in FIG. 3C, the first (upstream) recess 222 is present. In the illustrated configuration, the recess 222 comprises a closed end, having a flat lower surface 223. The flat lower surface 223 of the recess 222 extends between the inner wall 202 and the closure member 208 and forms the upper surface of the frangible connection 210.

The lower surface of the frangible connection 210 extends in the same plane as, and is contiguous with, the bearing surface 220. As shown in FIG. 3C, the width of the frangible connection 210 at its thinnest part can be controlled by forming the recess 222 such that the inner surface of the inner wall 202 immediately upstream of the frangible connection 210 is positioned radially outwardly or the inner surface of the inner surface of the inner wall 202 immediately downstream of the frangible connection 210. By offsetting in the point at which the inner surface of the inner wall 202 upstream of the frangible connection 210 with respect to the inner surface of the wall downstream of the frangible connection, the width of the frangible connection 210 at its thinnest point can be reduced to a dimension that is smaller than the width of the recess 222. This allows the formation of a frangible 210 connection having a width dimension smaller than any of the parts required to form the connection (e.g. in the mold). This can allow for a further improved frangible connection 210.

Referring again to FIG. 3A, the frangible connection 210 preferably extends in a plane P that is orthogonal to the longitudinal axis A of the cap assembly 200. By providing a flat seal (with respect to the longitudinal axis A), the frangible connection 210 tends to snap arounds its circumference at substantially the same time as the plug 300 (with its proximal-facing abutment surface 305 also oriented orthogonal to the longitudinal axis A) bears on the bearing surface 220. This is contrast to a frangible connection 210 that extends in a plane extending at a non-perpendicular angle to the longitudinal axis A, which tends to peel from the 'lower' end (the portion of the frangible connection 210 that is first brought into close proximity with the plug 300) towards the 'upper' end (the portion of the seal that is furthest from the advancing plug 300). Such peeling is often imperceptible to the user of the assembly, and may result in the user removing the cap assembly from the refillable vessel prematurely with the seal partially intact.

By contrast, one of the advantages of the frangible connection 210 breaking around the perimeter of the closure member 208 at the same time is that the frangible connection 210 may fail suddenly, causing a snap or click as the frangible connection 210 is broken. The snap or click failure of the frangible connection 210 can provide audible and/or tactile feedback to the user that the component sealing the refill system has been broken and that the concentrated cleaning fluid disposed within the capsule body 100 will be dispensed.

In the embodiments shown in FIGS. 2A-5, the system is configured such that the movable plug 300 bears against the bearing surface 220 of the closure member 208 as the plug 300 is moved The plug 300 will now be described in more detail with reference to FIGS. 4A-4C.

The plug 300 described herein includes a number of improvements that may provide enhance performance. The plug 300 may comprise an improved wall structure, an improved bearing surface for rupturing the frangible connection 210, enhanced safety features, and features that contribute to improved audible and tactile feedback to the user. Each of these improvements will be described in more detail below. Moreover, it will be appreciated that the features described below may be incorporated in a refill system alone, or in combination with other features to provide a further improved product.

Figure 4A:
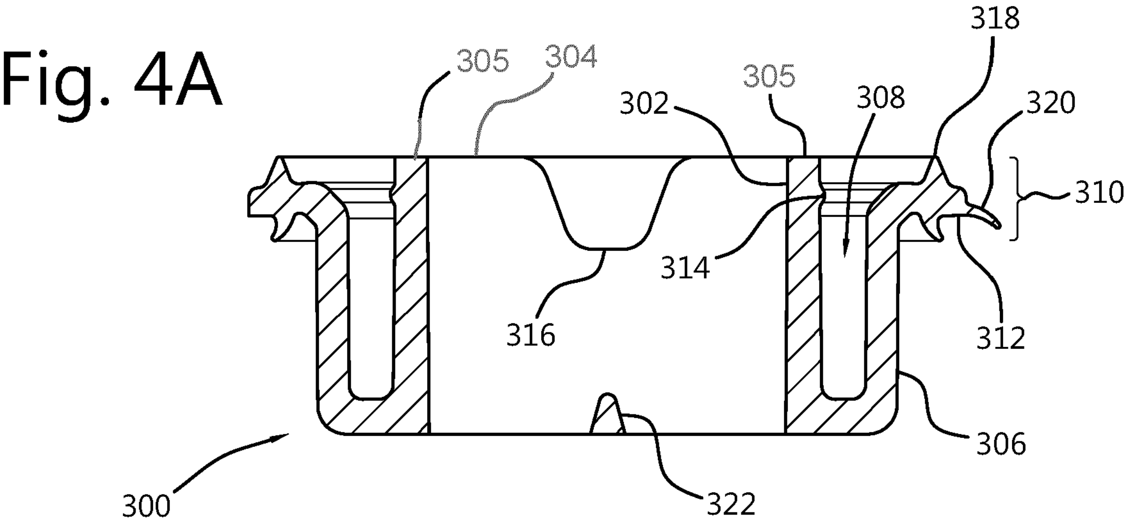
FIG. 4A shows a longitudinal cross-sectional view of a plug according to a first configuration.

FIG. 4A shows a cross-sectional view of the plug 300 comprising a proximal-facing abutment surface configured according to a first exemplary configuration. FIG. 4B shows a cross-sectional view of the plug 300 comprising a proximal-facing abutment surface configured according to a second exemplary configuration. FIG. 4C shows a perspective view of the plug 300 of FIG. 4B.

As shown in FIG. 4A, the plug 300 comprises a generally tubular body 302 defining an internal conduit therethrough, with a proximal rim 304 surrounding an upstream opening of the tubular body 302. The proximal rim 304 comprises a proximal-facing abutment surface 305 configured to bear against the bearing surface 220 of the closure member 208 as the plug 300 is moved from the first position, to the second position, as described above.

In the embodiment shown in FIG. 4A, the plug 300 further comprises a generally tubular skirt wall 306 that is arranged coaxially with respect to the tubular body 302, and surround the tubular body 302 along at least part of its length to provide a dual-walled plug 300. The skirt wall 306 is spaced apart from the tubular body 302 (in a radial direction) to form a plug recess 308 between the skirt wall 306 and the tubular body 302.

The skirt wall 306 is connected at its distal end to the distal end of the tubular body 302, and comprises a free proximal end. The free proximal end of the skirt 306 further comprises an outwardly extending flange 310 that provides a distal-facing abutment surface 312 for abutting a rim 406 of a refillable vessel 400 (see FIGS. 2A and 2B).

By providing a plug 300 comprising an inner tubular body 302 and an outer skirt 306, the plug 300 can be more securely retained within the cap assembly 200. For example, the plug recess 308 can accommodate a component (e.g. inner wall 202) of the cap assembly 200 to retain the plug 300 securely within the cap assembly 200 until the user screws the system onto a refillable vessel 400.

The proximal-facing abutment surface 305 can be configured in different ways, as will now be described with reference to FIGS. 4A and 4B.

As described above, the proximal-facing abutment surface 305 of the plug 300 is configured to be brought into contact with the bearing surface 220 of the closure member 208 as the plug 300 moves between its first position and its second position (see FIGS. 2A and 2B). As the proximal-facing abutment surface 305 is brought into contact with the bearing surface 220 of the closure member 208 and advanced further in a proximal direction, the frangible connection 210 breaks and the closure member 208 is lifted away from a position in which it occludes the conduit 203.

The proximal-facing abutment surface 305 of the plug can be configured to distribute the applied force evenly around the circumference of the frangible connection 210. In other words, the proximal-facing abutment surface 305 can be configured in such a manner that results in a net force being applied to the closure member 208 along the longitudinal axis A, and perpendicular to the plane in which the frangible connection 210 extends. Accordingly, the proximal-facing abutment surface 305 of the plug 300 preferably has at least two fold rotational symmetry with respect to the longitudinal axis A.

In the exemplary configuration shown in FIG. 4A, the proximal-facing abutment surface 305 of the plug 300 is provided by a circumferential rim 304 of the tubular body 302, terminating in a plane. By providing a circumferential rim in a plane perpendicular to the longitudinal axis A, the proximal-facing abutment surface 305 is simultaneously brought into contact with the bearing surface 220 around the circumference of the closure member 208.

The rim 304 that provides the proximal-facing abutment surface 305 may be continuous or can comprise one or more cut-outs 316.

Figure 4B:
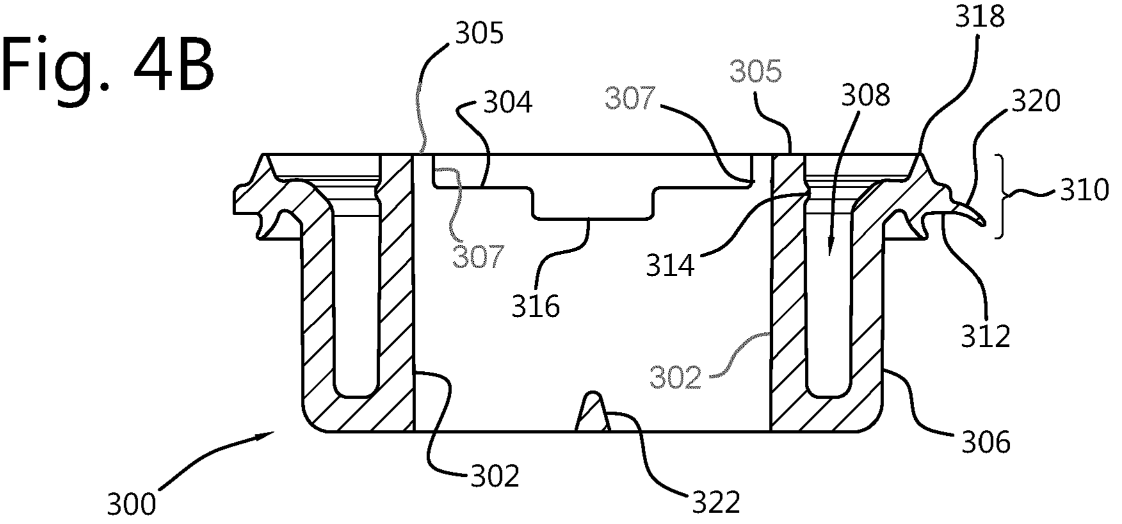
FIG. 4B shows a longitudinal cross-sectional view of a plug according to a second configuration.

In an alternative shown in FIG. 4B, the proximal-facing abutment surface 305 can comprise a discontinuous rim comprising a plurality of projections 307 (extending in a proximal direction) equally spaced circumferentially around the rim 304 of the tubular body 302, wherein the projections 307 terminate in a plane perpendicular to longitudinal axis A. The projections may take the form of teeth spaced equally around the circumference of the rim. For example, in the case of an abutment surface comprising two teeth, the teeth may be disposed diametrically opposite each other. A perspective view of a plug 300 comprising two diametrically opposed teeth is shown in FIG. 4C.

By providing a rotationally symmetric abutment surface configured to apply a net force along the longitudinal axis A, and perpendicular to the plane in which the frangible connection 210 extends, the frangible connection 210 can be configured to snap, failing around its circumference, rather than peeling asymmetrically from an initial breach around the seal. Such a circumferential failure of the seal can result in a snap or click sound that is audible to the user, thereby providing positive feedback that the frangible connection has been successfully broken and that the liquid contained in a capsule body can escape.

In addition or as an alternative to the features described above, the plug configurations described above can comprise additional feature to enhance the functionality of the plug 300. The following additional features may be combined with the abutment surface configurations described above with reference to FIGS. 4A-4C.

The distal-facing abutment surface 312 at the free end of the skirt wall 306 can be configured to provide multiple additional advantages. For example, the free end of the skirt wall 306 can comprise a proximal seal 318 configured to seal against the connecting wall 212 of the cap assembly 200. The proximal seal 318 can comprise a circumferential ridge comprising a peak. The peak provides a small surface area to be brought into contact with the connecting wall 212, thereby improving the seal.

The free proximal end of the skirt wall 306 can also comprise a one or more claws 320 configured to engage the threads 230 of the cap assembly 200. The engagement of the claw(s) 320 with the thread 230 can provide additional security that the plug 300 will remain in place within the cap assembly 200.

The claw(s) 320 may also retain the plug 300 within the cap assembly 200 after the product has been used. Since the plug 300 must be pushed into the cap assembly 200 to rupture the frangible connection 210, the claws are preferably configured to such that they can ride over the threads 230 of the cap assembly 200 as the plug 300 advances towards the closure member 208. The claw(s) 320 may thus comprise a distal facing concave surface and a convex proximal surface.

As shown in FIG. 4, the plug 300 may further comprise a circumferential ridge or protrusion 314 on an outer surface of the tubular body 302. The ridge or protrusion 314 can be configured to engage with a corresponding ridge or protrusion (e.g. ridge 216) on a complementary cap assembly 200. This may further improved the retention of the plug 300 within the cap assembly 200 before use, for example during transport and storage.

As shown in FIG. 4, the plug 300 can also comprise one or more cut-outs or slots 316 in the wall of the tubular body 302. The cut-outs or slots preferably extend from the proximal rim 304 of the tubular body 302 in a distal direction. The discontinuity in the rim 304 formed by the cut-outs or slots 316 may advantageously improve the flow of fluid through the cap assembly 200 and the plug 300 after the frangible connection 210 has been broken, by ensuring that the closure member 208 cannot form a seal against the rim 304 of the plug 300.

Figure 4C:
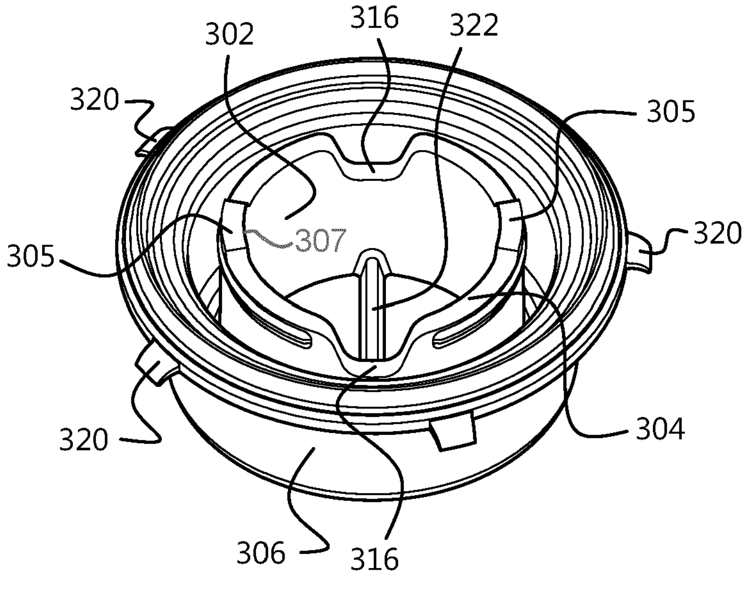
FIG. 4C shows a perspective view of the plug shown in FIG. 4B.

In the embodiment shown in FIGS. 4A-4C, the plug 300 comprises two diametrically opposed cut-outs 316 (although only one is visible in the cross-sectional view shown in FIG. 4). However, one cut-out may be provided, or three or more cut-outs can be provided in the tubular body 302.

Providing a discontinuity in the proximal-facing abutment surface 305 of the tubular body 302 may also provide the additional advantage of reducing the surface area of the proximal-facing abutment surface 305 that is brought into contact with the bearing surface 220 of the closure member 208, thereby increasing force per unit area exerted on the closure member 208.

Although not illustrated in the drawings, it will be appreciated that the closure member 208 may be modified (in addition to or as an alternative to the plug 300) to enhance the flow of cleaning fluid through the plug 300 and cap assembly 200 in a similar manner. For example, the closure member 208 may be modified to provide a discontinuity, such as a cut-out or recess, in the bearing surface 220 of the closure member 208 that prevents the closure member 208 from forming a seal with the plug 300 after the frangible connection 210 has been broken.

As will be appreciated, a plug 300 comprising a planar rim 304 and a closure member 208 comprising a planar bearing surface 220 may form a seal against each other in the event that the closure member 208 settles over the opening of the tubular member 302 of the plug 300. Should the planar surfaces align and come into contact to form a seal around the perimeter of the rim 304, the closure member 208 could prevent the egress of fluid from the capsule body 100 after the frangible connection 210 has been broken.

However, by providing one or more cut-outs or slots in either (or both) of the rim 304 or the bearing surface 220, in the event that the closure member 208 settles against the tubular body 302 of the plug 300, fluid contained in the capsule body 100 may still flow through the tubular body 302 of the plug 300 by way of the openings formed by the slots of cut-outs.

As shown in FIG. 4, the plug 300 may further comprise at least one barrier or beam 322 that extends across the distal opening of the tubular body 302. The beam 322 may extend across the diameter of the distal opening, or multiple beams can extend across the opening. The beam is configured to allow the flow of fluid therepast, but prevent or restrict the insertion of an object (e.g. a finger) into the conduit formed by the tubular body 302. This minimises the likelihood of the frangible connection 210 being broken inadvertently or improperly by way of an object passing through the tubular body 302.

The Refill System

As will now be described with reference to FIG. 5, when assembled, the capsule body 100, the cap assembly 200, and the plug 300 can provide a system providing yet further advantages.

FIG. 5 shows an enlarged view of the distal end of the refill system. The neck 104 of the capsule body 100 is clearly shown, and the rim 108 that surrounds the opening in the neck 104. The neck 104 of the capsule body 100 also comprises one or more threads 106 extending around the neck 104 (on an outer surface), which are configured to engage corresponding threads in the cap assembly 200.

The cap assembly 200 is also clearly shown. The cap assembly 200 comprises the dual walled construction described above with reference to FIGS. 3A and 3B. An inner surface of the outer wall 204 comprises one or more second screw threads 232 that are configured to engage the threads 106 on the capsule body 100.

The cap assembly 200 is screwed onto the capsule body 100 such that the rim 108 of the neck 104 is disposed within the upstream void **214*a*. Advantageously, the rim 108 of the neck 104 abuts the connecting wall 212 of the cap assembly 200. By engaging the capsule body 100 with the cap assembly 200 such that the rim 108 of the capsule body 100 abuts the connecting wall of the cap assembly 200, the neck 104 of the connecting wall 212 against flexing as the plug 300 bears against the closure member 208. Moreover, by abutting the rim 108 of the capsule body 100 against the connecting wall 212 of the cap assembly 200, additional security against leakage from the capsule body 100** can be provided.

The cap assembly 200 is further configured such that the upstream end of the inner wall 202 (which is optionally configured as a barrel shaped seal, as described above) is disposed within the neck 104 of the capsule body 100. The inner wall 202 thus forms an additional seal with the neck 104 of the capsule body 100.

The engagement between the plug 300 and the cap assembly 200 will now also be described with reference to FIG. 5. As shown in FIG. 5, the plug 300 is disposed within the cap assembly 200. The plug 300 shown in FIG. 5 is structurally similar to the plug 300 described with reference to FIG. 4.

As illustrated, the plug 300 is disposed within the cap assembly 200 such that the distal end of the inner wall 202 of the cap assembly 200 is disposed within the recess 308 formed between the tubular body 302 and the skirt wall 306. During assembly, the ridge 314 on the plug 300 is pushed passed the corresponding ridge 216 on the inner wall 202 of the cap assembly 200. The engagement of the ridges 216 and 314 may help to retain the plug 300 within the cap assembly 200 during transport and storage of the system 10.

The one or more claws 320 of the plug 300 may also help to retain the plug 300 within the cap assembly 200 by engaging the threads 230 on the interior surface of the outer wall 204. Preferably, at least two claws are provided to securely engage the thread(s) 230 on of the cap.

The combination of the plug 300 and the cap assembly 200 described herein may be configured to prevent the closure member 208 blocking the flow of fluid through the cap assembly 200 after the frangible connection 210 has been broken.

For example, as illustrated in the embodiment shown in FIG. 5, the inner wall 202 of the cap assembly 200 can be configured to have a first diameter downstream of the frangible connection 210 and a second, larger diameter upstream of the frangible connection 210. To ensure that the closure member 208 is pushed or lifted into a position in which it cannot seal against the inner wall 202 of the cap assembly 200 after the frangible connection 210 has been broken, the plug 300 can be configured such that the rim or abutment surface 304 can be moved upstream past the point at which the frangible connection 210 joins the closure member 208 to the inner wall 202. This can be achieved by ensuring that the maximum distance of travel of the plug 300 is not limited by the cap assembly 200 until the rim 204 has pushed the closure member 208 into the increased diameter portion of the conduit 203.

In the example shown in FIG. 5, the maximum travel of the plug 300 towards the frangible connection 210 is the point at which the seal 318 on the skirt wall 306 abuts the connecting wall 212 of the cap assembly 200. In the embodiment illustrated, the rim 304 of the tubular body 302 and the seal 318 terminate in the same transverse plane. To ensure that the travel of the plug 300 is not limited until after the closure member has been lifted away from the narrower part of the conduit 203, the frangible connection 210 is positioned downstream of the connecting wall 212.

Alternatively (or additionally), the rim or abutment surface 304 of the plug 300 can extend proximally beyond the sealing surface 318 of the skirt wall 306.

The capsule body 100, cap assembly 200, and plug 300 can be made of any suitable material known in the art. For example, the capsule body 100, cap assembly 200, and the plug 300 may be made of polyethylene or polypropylene, and may be formed by injection moulding techniques. Advantageously, the capsule body 100 can be formed of polyethylene, whilst the cap assembly 200 and the plug 300 can be formed of polypropylene.

It will be appreciated that aspects of the present invention include embodiments in which the features described above are provided alone or in combination with other features described here. For example, the frangible connection described above can be provided in a refill system having a cap assembly that screws directly onto the neck of a refillable vessel. In such systems, the cap can be configured such that the rim of the refillable vessel bears directly on the closure member to break the frangible connection and allow concentrated cleaning fluid to flow through the cap assembly into the refillable vessel.

Moreover, the plug described herein may be provided in a cap assembly having a different sealing arrangement to the arranged described herein. For example, the cut-outs and slots in the plug assembly that prevent a closure member sealing against the opening in the plug can be employed in cap assemblies with different structures, and with different closure members.

While the invention has been described with reference to exemplary or preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular or preferred embodiments or preferred features disclosed, but that the invention will include all embodiments falling within the scope of the appended claims.

The invention also comprises systems according to the following clauses:

Clause 1. A plug (300) for use in a cap assembly of a refill capsule, the plug (300) comprising:

a tubular body (302) with an open proximal end and an open distal end, wherein the open proximal end is surrounded by a first rim (304), and wherein the rim (304) further comprises at least first and second projections (307) extending in a proximal direction from the rim (304), wherein a proximal surface of the projections provides a proximal-facing abutment surface (305) for bearing against a bearing surface (220) of a frangible sealing component of a cap assembly;

wherein the proximal-facing abutment surface (305) extends in a plane that is orthogonal to a longitudinal axis (A) of the tubular body (302);

a skirt extending around the tubular body (302), and comprising a tubular skirt wall (306) arranged coaxially with respect to the tubular body (302), the skirt wall (306) being spaced apart from the tubular body (302) in a radial direction to form a plug recess (308) between the skirt wall (306) and the tubular body (302), wherein the plug (300) further comprises an outwardly extending flange (310) comprising a distal-facing abutment surface (312) for abutting a rim (406) of a refillable vessel (400), and wherein the proximal-facing abutment surface (305) has at least two fold rotational symmetry with respect to the longitudinal axis (A).

Clause 2. The plug (300) according to any preceding Clause, wherein the free end of the skirt wall (306) further comprises a proximal sealing rim (318) for sealing against a sealing surface (212) of a cap assembly (200).

Clause 3. The plug (300) according to any preceding Clause, wherein the proximal sealing rim (318) tapers to a peak.

Clause 4. The plug (300) according to any preceding Clause, wherein the sealing peak (318) terminates in the same plane as the proximal abutment surface (305).

Clause 5. The plug (300) according to any preceding Clause, wherein the tubular body (302) further comprises at least one cut-out (316) or slot distal in a wall of the tubular body (302).

Clause 6. The plug (300) according to any preceding Clause, wherein the cut-out (316) extends in a distal direction from the rim to form a discontinuity in the rim (304) of the plug (300), the rim (304) preferably comprising two or more cut-outs, and preferably, two diametrically opposed cut outs (316).

Clause 7. The plug (300) according to any preceding Clause, wherein the tubular body (302) comprises a protrusion or ridge (314) extending around an outer surface of the tubular body (302).

Clause 8. The plug (300) according to any preceding Clause, wherein the free proximal end of the skirt wall (306) further comprises at least one claw (320) radially outwardly of the distal abutment surface (312).

Clause 9. The plug (300) according to any preceding Clause, wherein the at least one claw (320) curves away from the distal abutment surface (312) to provide a distal concave surface and a proximal convex surface.

Clause 10. The plug (300) according to any preceding Clause, wherein the at least one claw (320) comprises two claws, preferably three claws, and more preferable four or more claws (320).

Clause 11. A cap system for a refill capsule, the cap system comprising:

the plug (300) of according to any preceding embodiment; and a cap assembly (200) comprising:

an inner wall (202) defining a conduit (203) through the cap assembly (200), the conduit (203) extending from an upstream end to a downstream end;

an outer wall (204) surrounding the inner wall (202) along at least a first portion of its length, wherein the outer wall (204) is spaced from the first portion of the inner wall (202) to define a circumferential void (214*b*) between the inner and outer walls (202, 204) extending from an open downstream end to a closed upstream end;

a connecting wall (212) extending between the inner and outer walls (202, 204) to prevent fluid flow through the void (214*b*), the connecting wall (212) forming the closed upstream end of the void (214*b*);

wherein the cap assembly (200) further comprises a closure member (208) configured to seal the conduit (203), the closure member (208) comprising an upstream side (208*a*) and a downstream side (208*b*), wherein the closure member (208) is sealed to the inner wall (202) with a peripheral frangible connection (210) located between proximal and distal ends of the conduit (203), wherein the frangible connection (210) extends in a plane P, which is orthogonal to a longitudinal axis (A) of the conduit (203); and wherein the plug (300) is disposed within the cap assembly (200) such that the outer wall (204) of the cap assembly (200) surrounds the plug (300), and the inner wall (202) of the cap assembly (200) extends into the plug recess (308), and wherein the proximal abutment surface (304) of the plug (300) is aligned with and opposes the bearing surface (220) of the closure member (208).

Clause 12. The system according to any preceding Clause, wherein the frangible connection (210) is disposed between a first peripheral recess (222) formed between the inner wall (202) and a downstream side (208*b*) of the closure member (208), and a second peripheral recess (224) between the inner wall (202) and an upstream side (208*b*) of the closure member (208).

Clause 13. The system according to any preceding Clause, wherein the bearing surface (220) extends in a plane that is perpendicular to the longitudinal axis (A) of the conduit (203).

Clause 14. The system according to any preceding Clause, wherein the closure member (208) is conical or frustoconical, and extends from a base to a peak (218).

Clause 15. The system according to any preceding Clause wherein the closure member (208) is hollow, and open at the base, and preferably wherein the closure member (208) is oriented with the peak (218) in an upstream direction and the base in a downstream direction.

Clause 16. The system according to any preceding Clause, wherein the outer wall (204) comprises engagement means, e.g. a screw thread (230) on its inner surface, and wherein the claws (320) are configured to engage the engagement means (230).

Clause 17. The system according to any preceding Clause, wherein the inner wall (202) comprises a protrusion or ridge (216) extending radially inwardly from an inner surface of the inner wall (202).

Clause 18. A refill system (10) comprising the system according to any preceding Clause, wherein the refill system further comprises a capsule (100) for containing a concentrated cleaning product, wherein the capsule (100) is engaged with the cap assembly (200) and wherein an internal volume of the capsule (100) is in fluid communication with an upstream end of the conduit (203).

Clause 19. The refill system (10) according to any preceding Clause, wherein the capsule (100) comprises an opening surrounded by a rim (104), and wherein the rim (104) bears against the connecting wall (212) of the cap assembly (200).

Clause 20. The refill system (10) according to any preceding Clause, further comprising a shrink wrap cover extending around at least a portion of the capsule (100) and at least a portion of the cap assembly (200).

Clause 21. A cap assembly (200) for a refill capsule, the cap assembly comprising:

an inner wall (202) defining a conduit (203) through the cap assembly (200), the conduit (203) extending from an upstream end to a downstream end;

an outer wall (204) surrounding the inner wall (202) along at least a first portion of its length, wherein the outer wall (204) is spaced from the first portion of the inner wall (202) to define a circumferential void (214) between the inner and outer walls (202, 204);

a connecting wall (212) extending between the inner and outer walls (202, 204) to prevent fluid flow through the void (214) between the inner and outer walls (202, 204);

wherein the cap assembly (200) further comprises a closure member (208) configured to seal the conduit (203), the closure member (208) comprising an upstream side (208*a*) and a downstream side (208*b*), and a bearing surface (220) on its downstream side;

wherein the closure member (208) is sealed to the inner wall (202) with a peripheral frangible connection (210) located between proximal and distal ends of the conduit (203), wherein the peripheral frangible connection (210) extends in a plane P, that is preferably orthogonal to a longitudinal axis (A) of the conduit (203);

wherein an inner surface of the inner wall (202) immediately upstream of the closure member (208) is off-set radially from an inner surface of the wall (202) immediately downstream of the closure member (208).

Clause 22. The cap assembly (200) according to any preceding Clause, wherein the bearing surface (220) extends perpendicular to the longitudinal axis (A) of the conduit (203).

Clause 23. The cap assembly (200) according to any preceding Clause, wherein the closure member (208) is hollow, and tapers from a downstream base (221) to an upstream peak (218).

Clause 24. The cap assembly (200) according to any preceding Clause, wherein the closure member (208) is open at the base.

Clause 25. The cap assembly (200) according to any preceding Clause, wherein the bearing surface (220) is adjacent to the frangible connection (210).

Clause 26. The cap assembly (200) according to any preceding Clause, wherein the conduit (203) has a first cross-sectional diameter at the upstream end and a second cross-sectional diameter at the downstream end, and wherein the first cross-sectional diameter is greater than the second cross-sectional diameter.

Clause 27. The cap assembly (200) according to any preceding Clause, wherein the void comprises a downstream void (214*b*) extending from an open downstream end and terminating in a closed end at the connecting wall (212).

Clause 28. The cap assembly (200) according to any preceding Clause, wherein the void comprises an upstream void (214*a*) extending from an open upstream end, and terminating in a closed end at the connection wall (214).

Clause 29. The cap assembly (200) according to any preceding Clause, wherein the void comprises an upstream void (214*a*) and a downstream void (214*b*), and wherein the upstream and downstream voids (214*a*, 214*b*) are separated from each other by the connecting wall (212).

Clause 30. The cap assembly (200) according to any preceding Clause, wherein the outer wall (204) downstream of the connection wall (212) comprises engagement means, e.g. a screw thread (230), configured to engage corresponding engagement means (404) on a refillable vessel (400).

Clause 31. The cap assembly (200) according to any preceding Clause, wherein the outer wall (204) upstream of the connecting wall (212) comprises engagement means, e.g. a screw thread (232), configured to engage corresponding engagement means (106) on a refill capsule (100).

Clause 32. The cap assembly (200) according to any preceding Clause, wherein the inner wall (202) comprises a protrusion or ridge (216) extending radially inwardly from an inner surface of the inner wall (202).

Clause 33. The cap assembly (200) according to any any preceding Clause, wherein the cap assembly (200) comprises polypropylene.

Clause 34. A cap system comprising the cap assembly (200) according to any preceding embodiment, and further comprising a plug (300), wherein the plug (300) is movably mounted within the cap assembly (200) for movement in an axial direction, and wherein the plug (300) is configured to bear upon the bearing surface (220) of the closure member (208) to break the frangible connection (210).

Clause 35. The system according to any preceding Clause, wherein the plug (300) comprises:

a tubular body (302) with an open proximal end and an open distal end, wherein the open proximal end is surrounded by a first rim (304) that provides an proximal abutment surface for bearing against the bearing surface (220) of the closure member (208);

a skirt extending around the tubular body (302), and comprising a tubular skirt wall (306) arranged coaxially with respect to the tubular body (302), the skirt wall (306) being spaced apart from the tubular body (302) in a radial direction to form a plug recess (308) between the skirt wall (306) and the tubular body (302), wherein the skirt wall (306) extends from a skirt distal end at which it is connected to the distal end of the tubular body (303), to a free proximal end, wherein the free proximal end of the skirt comprises:

an outwardly extending flange (310) comprising a distal facing abutment surface (312) for abutting a rim (406) of a refillable vessel (400), and wherein the plug (300) is disposed within the cap assembly (200) such that the downstream end of the inner wall (202) is disposed within the plug recess (308).

Clause 36. A refill system (10) comprising the cap system any preceding Clause, wherein the refill system further comprises a capsule body (100) for containing a concentrated refill fluid, wherein the capsule body (100) is engaged with the cap assembly (200) and wherein an internal volume of the capsule body (100) is in fluid communication with an upstream end of the conduit (203).

Clause 37. The refill system (10) according to any preceding Clause, wherein the capsule (100) comprises an opening surrounded by a rim (108), and wherein the rim (108) abuts the connecting wall (212) of the cap assembly (200).

Clause 38. The refill system (10) according to any preceding Clause, further comprising a shrink wrap cover extending around at least a portion of the capsule (100) and at least a portion of the cap assembly (200).

Clause 39. A cap assembly (200) for a refill capsule, the cap assembly comprising:

an inner wall (202) defining a conduit (203) through the cap assembly (200), the conduit (203) extending from an upstream end to a downstream end;

an outer wall (204) surrounding the inner wall (202) along at least a first portion of its length, wherein the outer wall (204) is spaced from the first portion of the inner wall (202) to define a circumferential void (214*a*, 214*b*) between the inner and outer walls (202, 204);

a connecting wall (212) extending between the inner and outer walls (202, 204) to prevent fluid flow through the void between the inner and outer walls (202, 204);

wherein the cap assembly (200) further comprises a closure member (208) configured to seal the conduit (203), the closure member (208) comprising an upstream side (208*a*) and a downstream side (208*b*), and a bearing surface (220) on its downstream side;

wherein the closure member (208) is sealed to the inner wall (202) with a peripheral frangible connection (210) located between proximal and distal ends of the conduit (203), wherein the peripheral frangible connection (210) extends in a plane P, which is orthogonal to a longitudinal axis (A) of the conduit (203);

wherein the frangible connection is disposed between a first peripheral recess (222) formed between the inner wall (202) and the downstream side (208*b*) of the closure member (208), and a second peripheral recess (224) between the inner wall (202) and the upstream side (208*b*) of the closure member (208).

Clause 40. The cap assembly (200) according to any preceding Clause, wherein the bearing surface (220) extends perpendicular to the longitudinal axis (A) of the conduit (203).

Clause 41. The cap assembly (200) according to any preceding Clause, wherein the closure member (208) is tapered, e.g. conical or frustoconical, and extends from a base (220) to a peak (218).

Clause 42. The cap assembly (200) according to any preceding Clause, wherein the closure member (208) is hollow and open at the base.

Clause 43. The cap assembly (200) according to any preceding Clause, wherein the closure member (208) is oriented with the peak (218) in an upstream direction and the base in a downstream direction.

Clause 44. The cap assembly (200) according to any preceding Clause, wherein the bearing surface (220) is adjacent to the frangible connection (210).

Clause 45. The cap assembly (200) according to any preceding Clause, wherein the conduit (203) has a first cross-sectional diameter upstream of the frangible connection (210) and a second cross-sectional diameter at the downstream of the frangible connection (210), and wherein the first cross-sectional diameter is greater than the second cross-sectional diameter.

Clause 46. The cap assembly (200) according to any any preceding Clause, wherein the circumferential void comprises a downstream void (214*b*) extending from an open downstream end and terminating in a closed end at the connecting wall (212).

Clause 47. The cap assembly (200) according to any preceding Clause, wherein the void comprises an upstream void (214*a*) extending from an open upstream end, and terminating in a closed end at the connection wall (214).

Clause 48. The cap assembly (200) according to any preceding Clause, wherein the void comprises an upstream void (214*a*) and a downstream void (214*b*), and wherein the upstream and downstream voids (214*a*, 214*b*) are separated from each other by the connecting wall (212).

Clause 49. The cap assembly (200) according to any any preceding Clause, wherein the outer wall (204) downstream of the connection wall (212) comprises engagement means, e.g. a screw thread (230), configured to engage corresponding engagement means (404) on a refillable vessel (400).

Clause 50. The cap assembly (200) according to any preceding Clause, wherein the outer wall (204) upstream of the connecting wall (212) comprises engagement means, e.g. a screw thread (232), configured to engage corresponding engagement means (106) on a refill capsule (100).

Clause 51. The cap assembly (200) according to any preceding Clause, wherein the inner wall (202) comprises a protrusion or ridge (216) extending radially inwardly from an inner surface of the inner wall (202).

Clause 52. The cap assembly (200) according to any preceding Clause, wherein the cap assembly (200) comprises polypropylene.

Clause 53. A cap system comprising the cap assembly (200) according to any preceding Clause, and further comprising a plug (300), wherein the plug (300) is movably mounted within the cap assembly (200) for movement in an axial direction, and wherein the plug (300) is configured to bear upon the bearing surface (220) of the closure member (208) to break the frangible connection (210) as it is advanced in a proximal direction.

Clause 54. The system according to any preceding embodiment, wherein the plug (300) comprises:

a tubular body (302) with an open proximal end and an open distal end, wherein the open proximal end is surrounded by a first rim (304) that provides an proximal-facing abutment surface for bearing against the bearing surface (220) of the closure member (208);

a skirt extending around the tubular body (302), and comprising a tubular skirt wall (306) arranged coaxially with respect to the tubular body (302), the skirt wall (306) being spaced apart from the tubular body (302) in a radial direction to form a plug recess (308) between the skirt wall (306) and the tubular body (302), wherein the skirt wall (306) extends from a skirt distal end at which it is connected to the distal end of the tubular body (303), to a free proximal end, wherein the free proximal end of the skirt comprises:

an outwardly extending flange (310) comprising a distal facing abutment surface (312) for abutting a rim (406) of a refillable vessel (400), and wherein the plug (300) is disposed within the cap assembly (200) such that the downstream end of the inner wall (202) is disposed within the plug recess (308).

Clause 55. A refill system (10) comprising the system according to any preceding Clause, wherein the refill system further comprises a capsule (100) for containing a concentrated refill fluid, wherein the capsule (100) is engaged with the cap assembly (200) and wherein an internal volume of the capsule (100) is in fluid communication with an upstream end of the conduit (203).

Clause 56. The refill system (10) according to any preceding Clause, wherein the capsule (100) comprises an opening surrounded by a rim (108), and wherein the rim (108) abuts the connecting wall (212) of the cap assembly (200).

Clause 57. The refill system (10) according to any preceding Clause, further comprising a shrink wrap cover extending around at least a portion of the capsule (100) and at least a portion of the cap assembly (200).

Clause 58. A plug (300) for use in a cap assembly of a refill capsule, the plug (300) comprising:

a hollow tubular body (302) with an open proximal end and an open distal end, wherein the open proximal end is surrounded by a first rim (304) that provides a proximal abutment surface for bearing against a frangible sealing component of a cap assembly;

wherein the proximal abutment surface lies in a plane that is orthogonal to a longitudinal axis of the tubular body, and surface surrounds, in total, at least half of the open proximal end;

a skirt extending around the tubular body (302), and comprising a tubular skirt wall (306) arranged coaxially with respect to the tubular body (302), the skirt wall (306) being spaced apart from the tubular body (302) in a radial direction to form a plug recess (308) between the skirt wall (306) and the tubular body (302), wherein the skirt wall (306) extends from a skirt distal end at which the skirt wall (306) is connected to the tubular body (302), to a free proximal end, wherein the free proximal end of the skirt comprises:

an outwardly extending flange (310) comprising a distal facing abutment surface (312) for abutting a rim (406) of a refillable vessel (400).

Clause 59. The plug (300) according to any preceding Clause, wherein the free end of the skirt wall (306) further comprises a proximal sealing rim (318) for sealing against a sealing surface (212) of a cap assembly (200).

Clause 60. The plug (300) according to any preceding Clause, wherein the proximal sealing rim (318) tapers to a peak.

Clause 61. The plug (300) according to any preceding Clause, wherein the sealing peak (318) terminates in the same plane as the rim (304).

Clause 62. The plug (300) according to any preceding Clause, wherein the tubular body (202) further comprises at least one cut-out (316) or slot to form a discontinuity in the first rim (304), preferably two or more cut-outs, and preferably, two diametrically opposed cut outs.

Clause 63. The plug (300) according to any preceding Clause, wherein the tubular body (302) comprises a protrusion or ridge (314) extending around an outer surface of the tubular body (302).

Clause 64. The plug (300) according to any preceding Clause, wherein the free proximal end of the skirt wall (306) further comprises at least one claw (320) radially outwardly of the distal abutment surface (312).

Clause 65. The plug (300) according to any preceding Clause, wherein the at least one claw (320) curves away from the distal abutment surface (312) to provide a distal concave surface and a proximal convex surface.

Clause 66. The plug (300) according to any preceding Clause, wherein the at least one claw (320) comprises two claws, preferably three claws, and more preferable four or more claws (320).

Clause 67. A cap system for a refill capsule, the cap system comprising:

the plug (300) of any preceding claim; and a cap assembly (200) comprising:

an inner wall (202) defining a conduit (203) through the cap assembly (200), the conduit (203) extending from an upstream end to a downstream end;

an outer wall (204) surrounding the inner wall (202) along at least a first portion of its length, wherein the outer wall (204) is spaced from the first portion of the inner wall (202) to define a circumferential void (214*b*) between the inner and outer walls (202, 204) extending from an open downstream end to a closed upstream end;

a connecting wall (212) extending between the inner and outer walls (202, 204) to prevent fluid flow through the void (214*b*), the connecting wall (212) forming the closed upstream end of the void (214*b*);

wherein the cap assembly (200) further comprises a closure member (208) configured to seal the conduit (203), the closure member (208) comprising an upstream side (208*a*) and a downstream side (208*b*), wherein the closure member (208) is sealed to the inner wall (202) with a peripheral frangible connection (210) located between proximal and distal ends of the conduit (203), wherein the frangible connection (210) extends in a plane P, which is orthogonal to a longitudinal axis (A) of the conduit (203); and wherein the plug (300) is disposed within the cap assembly (200) such that the outer wall (204) of the cap assembly (200) surrounds the plug (300), and the inner wall (202) of the cap assembly (200) extends into the plug recess (308), and wherein the proximal abutment surface (304) of the plug (300) is aligned with and opposes the bearing surface (220) of the closure member (208).

Clause 68. The system according to any preceding Clause, wherein the frangible connection (210) is disposed between a first peripheral recess (222) formed between the inner wall (202) and a downstream side (208*b*) of the closure member (208), and a second peripheral recess (224) between the inner wall (202) and an upstream side (208*b*) of the closure member (208).

Clause 69. The system according to any preceding Clause, wherein the bearing surface (220) extends in a plane that is perpendicular to the longitudinal axis (A) of the conduit (203).

Clause 70. The system according to any any preceding Clause, wherein the closure member (208) is conical or frustoconical, and extends from a base to a peak (218).

Clause 71. The system according any preceding Clause, wherein the closure member (208) is hollow, and open at the base, and preferably wherein the closure member (208) is oriented with the peak (218) in an upstream direction and the base in a downstream direction.

Clause 72. The system according to any preceding Clause, wherein the outer wall (204) comprises engagement means, e.g. a screw thread (230) on its inner surface, and wherein the claws (320) are configured to engage the engagement means (230).

Clause 73. The system according to any preceding Clause, wherein the inner wall (202) comprises a protrusion or ridge (216) extending radially inwardly from an inner surface of the inner wall (202).

Clause 74. A refill system (10) comprising the system according to any preceding Clause, wherein the refill system further comprises a capsule (100) for containing a concentrated cleaning product, wherein the capsule (100) is engaged with the cap assembly (200) and wherein an internal volume of the capsule (100) is in fluid communication with an upstream end of the conduit (203).

Clause 75. The refill system (10) according to any preceding Clause, wherein the capsule (100) comprises an opening surrounded by a rim (104), and wherein the rim (104) bears against the connecting wall (212) of the cap assembly (200).

Clause 76. The refill system (10) according to any preceding Clause, further comprising a shrink wrap cover extending around at least a portion of the capsule (100) and at least a portion of the cap assembly (200).

Clause 77. A cap system comprising:

a cap assembly (200) comprising:

an inner wall (202) defining a conduit (203) through the cap assembly (200), the conduit (203) extending from an upstream end to a downstream end; and an outer wall (204) surrounding the inner wall (202) and spaced from the inner wall (202) to define a circumferential void (214*a*, 214*b*) between the inner and outer walls (202, 204);

wherein the cap assembly (200) further comprises a closure member (208) configured to seal the conduit (203), the closure member (208) comprising an upstream side (208*a*) and a downstream side (208*b*), and a bearing surface (220) on its downstream side (208*b*);

wherein the closure member (208) is sealed to the inner wall (202) with a frangible connection (210) located between proximal and distal ends of the conduit (203), wherein the frangible connection (210) extends in a first plane, which is orthogonal to a longitudinal axis (A) of the conduit (203); and wherein the system further comprises a plug (300) comprising:

a tubular body (302) with an open proximal end and an open distal end, wherein the open proximal end is surrounded by a first rim (304), and wherein the rim (304) further comprises a proximal abutment surface (305), extending in a second plane, for bearing against the bearing surface (220) of the closure member (208), wherein the plug (300) further comprises an outwardly extending flange (310) comprising a distal-facing abutment surface (312) for abutting a rim (406) of a refillable vessel (400), and wherein the plug (300) is movable between a first position, in which the proximal abutment surface (305) is located downstream of the frangible connection (210), and a second position in which the proximal abutment surface (305) is located upstream of the frangible connection (210), to thereby break the frangible connection (210), and wherein abutment surface (305) is configured to bear against the bearing surface of the closure member as the plug moves from the first position to the second position such that a net force applied to the closure member is along the longitudinal axis A, and perpendicular to the first and second planes.

Clause 78. The cap system according to any preceding Clause, wherein the proximal abutment surface of the plug has at least two fold rotational symmetry with respect to the longitudinal axis A.

Clause 79. The cap system according to any preceding Clause, wherein the closure member (208) is hollow, and tapers from a downstream base (219) to an upstream peak (218).

Clause 80. The cap system according to any preceding Clause, wherein the base (219) comprises an opening, and wherein the bearing surface (220) surrounds the opening.

Clause 81. The cap system according to any any preceding Clause, wherein the conduit (203) has a first cross-sectional diameter at the upstream end and a second cross-sectional diameter at the downstream end, and wherein the first cross-sectional diameter is greater than the second cross-sectional diameter.

Clause 82. The cap system according to any preceding Clause, wherein the plug further comprises a skirt wall (306) arranged coaxially with and extending around the tubular body (302), the skirt wall (306) being spaced apart from the tubular body (302) in a radial direction to form a plug recess (308) between the skirt wall (306) and the tubular body (302).

Clause 83. The cap system according to any preceding Clause, wherein the inner wall (202) comprises a protrusion or ridge (216) extending radially inwardly from an inner surface of the inner wall (202).

Clause 84. The cap system according to any preceding Clause t, wherein the outer wall of the cap assembly (200) comprises at least one screw thread on an internal surface of the outer wall, and wherein the skirt wall (306) of the plug (300) comprises at least one radially outwardly extending claw configured to engage the screw thread.

Clause 85. The cap system according to any preceding Clause, wherein the tubular body (302) comprises a protrusion or ridge extending radially outwardly from an outer surface of the tubular body (302).

Clause 86. The cap system according to any preceding Clause, wherein the abutment surface (305) is provided by one or more projections (307) extending proximally from the rim (304), the projections (307) terminating in a proximal surface extending in a plane (P) orthogonal to the longitudinal axis (A).

Clause 87. The cap system according to any preceding Clause, wherein the one or more projections (307) comprises a plurality of projections, equally spaced circumferentially around the rim (304).

Clause 88. The cap system according to any preceding Clause, wherein the abutment surface (305) is provided in the same plane as the rim (304).

Clause 89. The cap system according to any preceding Clause, wherein the rim (304) further comprises a cut-out (316) to form a discontinuity in the rim (304).

Clause 90. The cap system according to any preceding Clause, wherein the free proximal end of the skirt wall (306) further comprises at least one claw (320) extending radially outwardly from the skirt wall (306).

Clause 91. A refill system comprising the cap system of any preceding Clause, and further comprising:

a capsule body (100) for containing a concentrated cleaning product, wherein the capsule body (100) is engaged with the cap assembly (200) and wherein an internal volume (102) of the capsule body (100) is in fluid communication with an upstream end of the conduit (203).

Clause 92. The refill system according to any preceding Clause, further comprising a shrink wrap cover extending around at least a portion of the capsule body (100) and at least a portion of the cap assembly (200).

The invention claimed is:

1. A cap system comprising:

a cap assembly comprising:

an inner wall defining a conduit through the cap assembly, the conduit extending from an upstream end to a downstream end; and an outer wall surrounding the inner wall and spaced from the inner wall to define a circumferential void between the inner and outer walls;

wherein the cap assembly further comprises a closure member configured to seal the conduit, the closure member comprising an upstream side and a downstream side, and a bearing surface on its downstream side; wherein the closure member is hollow, and tapers from a downstream base to an upstream peak;

wherein the closure member is sealed to the inner wall with a frangible connection located between proximal and distal ends of the conduit, wherein the frangible connection extends in a first plane, which is orthogonal to a longitudinal axis (A) of the conduit; and wherein the system further comprises a plug comprising:

a tubular body with an open proximal end and an open distal end, wherein the open proximal end is surrounded by a first rim, and wherein the rim further comprises a proximal abutment surface, extending in a second plane, for bearing against the bearing surface of the closure member, wherein the plug further comprises an outwardly extending flange comprising a distal-facing abutment surface for abutting a rim of a refillable vessel, and wherein the plug is movable between a first position, in which the proximal abutment surface is located downstream of the frangible connection, and a second position in which the proximal abutment surface is located upstream of the frangible connection, to thereby break the frangible connection, and wherein the proximal abutment surface is configured to bear against the bearing surface of the closure member as the plug moves from the first position to the second position such that a net force applied to the closure member is along the longitudinal axis (A), and perpendicular to the first and second planes.

2. The cap system according to claim 1, wherein the proximal abutment surface of the plug has at least two fold rotational symmetry with respect to the longitudinal axis (A).

3. The cap system according to claim 1, wherein the base comprises an opening, and wherein the bearing surface surrounds the opening.

4. The cap system according to claim 1, wherein the conduit has a first cross-sectional diameter at the upstream end and a second cross-sectional diameter at the downstream end, and wherein the first cross-sectional diameter is greater than the second cross-sectional diameter.

5. The cap system according to claim 1, wherein the plug further comprises a skirt wall arranged coaxially with and extending around the tubular body, the skirt wall being spaced apart from the tubular body in a radial direction to form a plug recess between the skirt wall and the tubular body.

6. The cap system according to claim 1, wherein the inner wall comprises a protrusion or ridge extending radially inwardly from an inner surface of the inner wall.

7. The cap system according to claim 5, wherein the outer wall of the cap assembly comprises at least one screw thread on an internal surface of the outer wall, and wherein the skirt wall of the plug comprises at least one radially outwardly extending claw configured to engage the screw thread.

8. The cap system according to claim 1, wherein the tubular body comprises a protrusion or ridge extending radially outwardly from an outer surface of the tubular body.

9. The cap system according to claim 1, wherein the abutment surface is provided by one or more projections extending proximally from the rim, the projections terminating in a proximal surface extending in a plane orthogonal to the longitudinal axis.

10. The cap system according to claim 1, wherein the one or more projections comprises a plurality of projections, equally spaced circumferentially around the rim.

11. The cap system according to claim 1, wherein the abutment surface is provided in the same plane as the rim.

12. The cap system according to claim 1, wherein the rim further comprises a cut-out to form a discontinuity in the rim.

13. The cap system according to claim 1, wherein the free proximal end of the skirt wall further comprises at least one claw extending radially outwardly from the skirt wall.

14. A refill system comprising the cap system of claim 1, and further comprising:

a capsule body for containing a concentrated cleaning product, wherein the capsule body is engaged with the cap assembly and wherein an internal volume of the capsule body is in fluid communication with an upstream end of the conduit.

15. The refill system according to claim 14, further comprising a shrink wrap cover extending around at least a portion of the capsule body and at least a portion of the cap assembly.

* * * * *